(12) United States Patent
Cheong et al.

(10) Patent No.: US 7,642,989 B2
(45) Date of Patent: Jan. 5, 2010

(54) SYSTEM FOR AND METHOD OF MOTION AND FORCE SYNCHRONIZATION WITH TIME DELAY REDUCTION IN MULTI-USER SHARED VIRTUAL ENVIRONMENTS

(75) Inventors: Joono Cheong, Pohang (KR); Anuradha M. Annaswamy, West Newton, MA (US); Mandayam A. Srinivasan, West Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 780 days.

(21) Appl. No.: 11/378,151

(22) Filed: Mar. 17, 2006

(65) Prior Publication Data

US 2006/0256080 A1 Nov. 16, 2006

Related U.S. Application Data

(60) Provisional application No. 60/662,584, filed on Mar. 17, 2005.

(51) Int. Cl.
G09G 5/00 (2006.01)
G05B 13/02 (2006.01)
(52) U.S. Cl. .................. 345/2.1; 345/156; 700/45
(58) Field of Classification Search ............. 345/156, 345/1.1, 2.1; 700/45; 709/204
See application file for complete search history.

(56) References Cited

U.S. PATENT DOCUMENTS

| 6,343,313 B1 * | 1/2002 | Salesky et al. ........... 709/204 |
| 6,570,555 B1 * | 5/2003 | Prevost et al. ........... 345/156 |
| 6,902,482 B1 | 6/2005 | Woolston ............... 463/37 |
| 6,933,920 B2 | 8/2005 | Lacroix et al. .......... 345/156 |
| 6,961,309 B2 | 11/2005 | Carlson et al. ........... 370/235 |
| 7,027,965 B2 | 4/2006 | Hannaford et al. ........ 703/2 |
| 7,420,527 B2 * | 9/2008 | Sato et al. ............... 345/2.1 |

OTHER PUBLICATIONS

International Search Report completed Jul. 20, 2006 and mailed on Aug. 21, 2006.

* cited by examiner

Primary Examiner—Kevin M Nguyen
(74) Attorney, Agent, or Firm—Burns & Levinson LLP; Stephen Y. Chow

(57) ABSTRACT

Systems, methods and computer-executable code stored on computer readable media for synchronizing the evolving state of a dynamic object in a shared virtual environment among a plurality of geographically separated computers connected in a communications network including data communications links introducing time delays in the propagation of data between said computers. The synchronization scheme utilizes an advanced feedback controller to compensate for the state error between sites, comprised of a linear compensator and a Smith predictor based internal model, to determine correct control forces creating a smooth input while maintaining high levels of responsiveness and consistency. A recovery filter for restoring the natural motion of the virtual object distorted by synchronization control is also described.

35 Claims, 13 Drawing Sheets

SYSTEM FOR AND METHOD OF MOTION AND FORCE SYNCHRONIZATION WITH TIME DELAY REDUCTION IN MULTI-USER SHARED VIRTUAL ENVIRONMENTS

CROSS-REFERENCE TO RELATED APPLICATIONS

This application claims the benefit of priority to U.S. Provisional Application Ser. No. 60/662,584 filed 17 Mar. 2005 and entitled "Motion Synchronization Scheme for Multi-User Shared Virtual Environment Simulations with Time Delay", the contents of which are hereby incorporated by reference in their entirety.

STATEMENT OF GOVERNMENT INTEREST

The U.S. Government may have certain rights to this invention under Grant No. N66001-02-C-8022 from the U.S. Navy.

FIELD OF THE INVENTION

This invention relates generally to software systems and methods for representing user activity in a multi-user, multi-location shared virtual environment, and in particular to computer-based feedback control systems and methods for presenting physically realistic simulations to the users while compensating for time delays inherent in the communications links between the user stations.

BACKGROUND OF THE INVENTION

Shared virtual environments (SVEs) provide virtual places and low level supportive frames using network communication in various applications including CAD, military training simulation, remote conferencing, general haptic collaboration, interactive educations, on-line games, and so forth. (See S. Singhal and M. Zyda, *Networked Virtual Environments: Design and Implementation,* Addison-Wesley, 1999, incorporated herein by reference.) Consistency and responsiveness, the two most important concepts in SVEs, correspond to the closeness of the states among participating user sites (i.e., computers or stations), and how quickly the users receive the response to their and others' interaction with the SVE, respectively.

Conventionally, consistency and responsiveness are achieved by using a concurrency control strategy, whose approach coordinates all the transactions that occur between participants. However, if the communication delays between participants become large, such approaches lead to poor responsiveness. For example, a pessimistic concurrency control allows only one transaction between a server and the clients at a time. One of the primary complaints about these systems is that they are "laggy," in other words, that they respond sluggishly and erratically when the user invokes a command due to inherent system latency created by the need to transmit information to and from the user to a central server which processes the information. This lag occurs because the user's computer cannot process the command and display the results until after it has consulted with a central server. If every client contends for a transaction, each client needs to wait idly until its transaction is approved. Semi-optimistic concurrency control improves the responsiveness momentarily, but leads to unsatisfactory consistency and sometimes non-smooth behaviors, which is not suitable for treating the SVEs, where motion is involved.

There is appreciable interest in the class of SVEs that is designed for haptic collaboration, which deals with a manipulation of shared virtual objects by multiple users, exchanging haptic forces (that is, forces involved in the touch, feel, and manipulating of objects, such as during manual exploration and manipulation.) The introduction of haptic forces initiates dynamic motion of the engaged virtual object. For a realistic display of haptics and graphics, the motion needs to be created so as to follow physical laws (e.g. Newton's laws). If the latency of response is over 30 msec to a user's action, he perceives a disorder in the sense of touch. This suggests that every distributed user should receive immediate response to his input via haptic and/or visual feedbacks, and that the concurrency control strategy will not guarantee such a high responsiveness if communication delay is large. Hence, SVEs for haptic collaboration need a new method that is perhaps an improvement over a concurrency control strategy and also is suitable for a situation where the delay can be large.

The Transatlantic Touch was a long distance virtual touch project carried out between Massachusetts Institute of Technology (MIT) and University College of London (UCL). (see J. Kim, et al., "Transatlantic Touch: A study of haptic collaboration over long distance," *Presence: Teleoperators and Virtual Environments,* vol. 13, no., pp. 328-337, 2004.) In the project, two users, one at MIT and the other at UCL, performed collaborative grasping of a shared virtual object as pre-planned sequences, feeling the presence of remote users through the haptic force communication by direct peer-to-peer connection. Each user interacted with his local replica of the SVE state managed separately, so each received instant haptic and visual responses from his input. However, as the communication delay became severe, the haptic task induced a large inconsistency between users who could not recover from the situation.

Sensitivity to latency also presents a significant obstacle to implementing SVEs on the Internet, because the latencies associated with the Internet can be substantial and quite unpredictable. Therefore, what is needed is a technique for overcoming such difficulties associated with the prior art when implementing SVEs. In particular, what is needed is a technique for resolving latency concerns in a multi-user SVEs not only within a local area network but also with other IP Internet configurations having random variation of time delay during the communication having a specified maximum tolerable delay.

SUMMARY OF THE INVENTION

The present invention provides, in distinct aspects, methods, systems and machine-readable program storage media tangibly embodying programs of instructions for synchronizing the state of a dynamic virtual object in a shared virtual environment (SVE) among a plurality of geographically separated computers connected in a communications network. A synchronization scheme is presented to achieve a high level of consistency in peer-to-peer and certain client/server based SVEs. The invention focuses on SVEs with dynamic virtual objects that show physically realistic behaviors as in haptic collaboration tasks. The synchronization scheme utilizes an advanced feedback controller to compensate for state errors between separated sites with a significant amount of time delay. The controller, which is comprised of a linear compensator and a Smith predictor based internal model, creates smooth input to accommodate the state error in real-time.

The synchronization controller is applied to each participating computer network, which each simulate both static SVE components and dynamic virtual objects through the use of synchronous local models of the state of dynamic virtual objects in the SVE. At initiation, each synchronous local model of the virtual object state is identical, but thereafter continuously evolves with users input. Each user is permitted to provide inputs via input means such as, for example, haptic devices in order to interact with the corresponding synchronous local model of the dynamic virtual object state so as to induce one or more local changes. The local changes in state are propagating from each computer sequences of data packets to another computer (either another peer or a server, depending upon the embodiment) along network communications links that introduce time delays (latency) into the propagation. Each computer also receives similar sequences of data packets propagated from another computer that have time delays. The synchronization controller compensates at each computer for dynamic virtual object state errors, as will be described in detail below.

BRIEF DESCRIPTION OF THE FIGURES

For a better understanding of the present invention, together with other and further objects thereof, reference is made to the accompanying drawing and detailed description, wherein.

DETAILED DESCRIPTION OF PREFERRED EMBODIMENTS OF THE INVENTION

I. Overview

Figure 1:
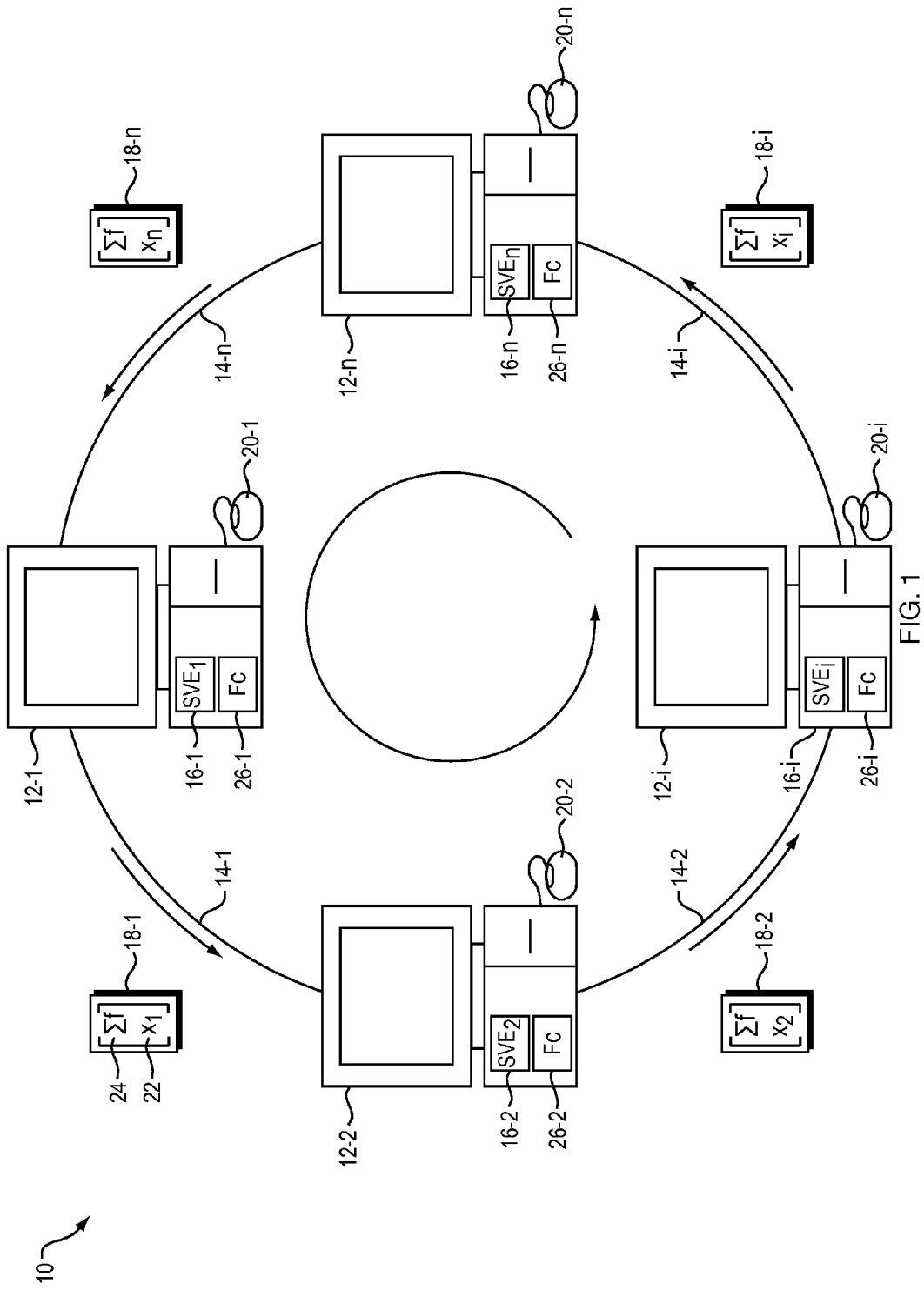
FIG. 1 is a diagram illustrating ring-type data communications network for use with an embodiment of the present invention.

With reference to FIG. 1, the present invention provides a computerized system and feedback control method for providing physically realistic computer simulations in multi-user shared virtual environments (SVEs) 16-1 to 16-n being simulated at each of a plurality of geographically separated computers 12-1 to 12-n in a data communications network 10 having associated varying time delays inherent in data communications links 14-1 to 14-n between the computers. The present invention enables each user using one of the computers (or "participants") 12-1 to 12-n an immediate interaction with virtual objects in the SVEs 16-1 to 16-n while maintaining consistency within a tolerable bound (a maximum tolerable delay) between the users. When a user interacts with the locally simulated synchronous model of the SVE including both static and dynamic portions, such as through input devices such as haptic devices 20-1 to 20-n, for example, a local change in the state of a dynamic virtual object in the SVE (reflected in the synchronous local model) is induced and is propagated in sequences of time-stamped data packets 18-1 to 18-n along the communication links 14-1 to 14-n, and it is received and adopted continuously by the rest of the computers in network 10 in real-time. The static portions of the SVE are maintained at each computer and are independent of the evolving dynamic states of the virtual objects, whose state data circulates. The propagation can continue by using a ring-type topology between or among the networked computers 12-1 to 12-n, such that the data packets 18-1 to 18-n circulate in a closed network.

As will be described, the present invention provides a control algorithm that accommodates latency reduction not only in local area network (LAN) environments, but also wide area IP Internet network configurations having random variation of time delay during the data communications, provided the total round-trip delay is below a maximum allowable delay, $R_{MAD}$. Due to the real-time nature of collaborative haptic simulation, a UDP (User Datagram Protocol) streaming method is preferred instead of a TCP (Transmission Control Protocol) streaming one. At the instances at which the data is sent, the local time is always stamped so that the amount of round trip delay may be computed during feedback.

Server-client embodiments of the invention are substantially equivalent to ring-type peer-to-peer, as a sever acts only as a linker or switch that distributes data packets in order that flow of data packets circulates the whole participant network in an ordered manner. In a server-client implementation: (a) every client is communicating with server, and no direct peer-to-peer connection is made; (b) the server receives all the data packets from clients; and (c) the server then links data flow from (i)-th station to (i+1)-th station, creating a system equivalent to a closed ring network. The server-client configuration provides preferred data management because of its capability of regulating data flow rate, checking lost packets, and doing other well-known server roles. The cost is the increased network round trip delay.

The user naturally expects an immediate response to his input action, when using an interactive realistic physical simulation such as haptic simulations. In certain situations, for improved human perception, comfort, and satisfaction, fast responsiveness may be more critical than strict consistency. Thus, a goal of the present invention is to provide a feedback algorithm that enables high responsiveness while maintaining a sufficient level of consistency of the dynamic virtual objects in SVE applications using the communications network 10. The system includes a feedback controller (described in detail below) for the regulation of differences in the local states of the SVEs between (or among) the networked computers.

In the following description, for purposes of explanation, numerous specific details of a two-participant network with an advanced feedback controller to compensate for state error between geographically separated computers with a significant amount of time delay are set forth in order to provide a thorough understanding of the present invention. It will be evident, however, to one skilled in the art that the present invention may be practiced without all of the specific details presented, and that the invention is more generally applicable to higher numbers of dynamic virtual objects and/or computers, which may be arranged in ring-type peer-to-peer or certain client-server communications networks permitting circulatory information (data packet) propagation and having compensable latency. Furthermore, the present invention includes methods having various steps. These steps may be embodied in computer program instructions on computer-readable media. The instructions can be used to cause a general purpose processor which is programmed with the instructions to perform the steps. Alternatively, the steps of the present invention may be performed by specific hardware components that contain hardwired logic for performing the required steps, or by any combination of programmed general purpose computer components and custom hardware components. Also, the terms computer, station and participant are used interchangeably in the description that follows.

II. System Architecture

Each computer 12 (and, in client-server embodiments, the server) may be a conventional IBM Personal Computer (PC) or Intel Central Processing Unit (CPU)-based computer utilizing Microsoft Windows 95 or Windows NT, a computer from Apple Corporation such as the iMac, a computer utilizing Linux and the X Window System which may be based on the Intel, PowerPC, DEC Alpha, or more powerful computer such as a Cray X-MP, a parallel UNIX-based supercomputer such as a Cray T3E, Thinking Machines CM-5, or SGI Origin 2000. The computers 12 may be assisted by servers forming a bank of servers connected via Ethernet, an Asynchronous Transfer Mode (ATM)-switch, or other fast local interconnect, or via a long-distance interconnect, or other high-speed Internet connection. Each computer requires a suitable connection to provide appropriate bandwidth and data transmission speed for use with the invention. The exact computing power and communications bandwidth requirements for the system will depend upon the specific use of the invention (e.g., CAD, military training simulation, remote conferencing, general haptic collaboration, interactive educations, on-line games, and so forth.)

The computers 12 support numerous types of program components, including a display component, an interaction component, a feedback controller component, and optionally but preferably a recovery filter component, the latter two of which will be described in detail below. The interaction component is responsive to user input through one of the input devices 20, which comprises any combination of devices such as a mouse, a joystick, a trackball, a keyboard, and preferably includes haptic input devices with or without force-feedback, and/or audible outputs. The display component is responsible for rendering graphics on display devices connected to associated computers. Each of the computers 12 is time-synchronized with the other computers, in order that time-stamped data in the data packets 18-1 to 18-$n$ may be exploited by the other computers.

Each computer 12-1 to 12-$n$ includes internal (not shown) memory including both random access memory (RAM) and read-only memory (ROM), and a mass storage device such as, for example, optical, magnetic, or other similar storage medium suitable for use with a personal computer system. In one embodiment, the present invention provides software that when executed implements the inventive methods described below, the software being stored on media readable by the processors of the computers.

Conventional techniques for implementing virtual environments are known in the art and will not be described herein, but typically involve modeling a SVE in a database and, through rendering commands, data are sent from the database to a display of the computer system to generate various scenes representing the SVE.

A. Statement of the Problem

Figure 5:
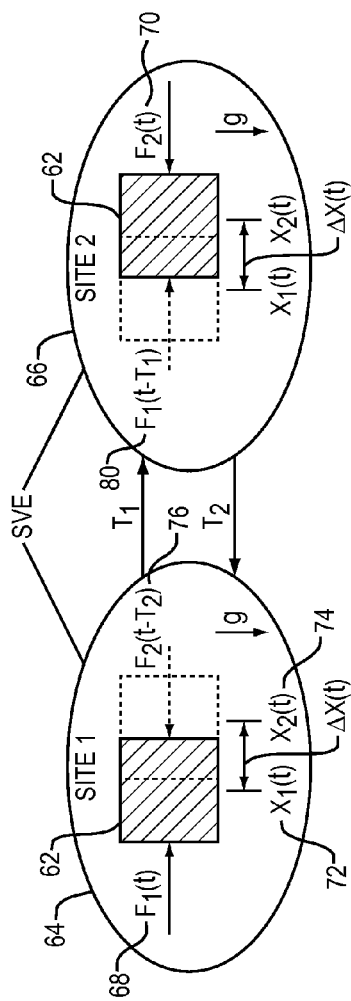
FIG. 5 is a schematic illustrating state deviation of a dynamic virtual object due to communication delays in a two-user SVE system.

The present invention is probably best understood in the context of a problem solved by the invention and illustrated in FIG. 5, the kinematic pose of a dynamic virtual object (a cube 62) used in the Transatlantic touch haptic collaboration project referenced above, where two long distance users, at site-1 64 and site-2 66, respectively, were asked to hold-the cube 62 and lift it against the gravitational force for a duration of time by applying forces 68,70 in two opposite directions.

The challenge is how to synchronize the SVE at each site. The motion of the cube at site-1, $X_1(t)$ 72, is computed by local force $F_1(t)$ 68 and remote force $F_2(t-T_2)$ 76 by Newton's law, while motion of the cube at site-2, $X_2(t)$ 78, is computed by remote force $F_1(t-T_1)$ 80 and local force $F_2(t)$ 70, where T1 and T2 are communication delays from site-1 to site-2 and from site-2 to site-1, respectively. As time progresses, because the user input histories are different at both sites, the deviation of the position, $\Delta X(t)=X_2(t)-X_1(t)$, develops and would accumulate without any synchronization treatment.

The present invention provides a feedback controller that produces corrective inputs $F_u$'s on participant sites to such that the inconsistency of state $\Delta X(t)$, arising in general physical motions of virtual objects in SVEs with large communications delay, remains small or tends to zero asymptotically.

B. Feedback Synchronization Controller

Each of the computers 12 maintain in resident or nonresident memory a local model implemented by the software architecture described below which provides an all-inclusive description of the SVE. The SVE can range from a set of virtual objects having simple interrelationships defined by the users such as, for example, a game, to an entire simulated environment having a landscape with varied terrain. Each model contains an all-inclusive description of each virtual object in the virtual environment. The descriptions of virtual objects modeled by the software not only include the appearance of the virtual object but also a description of how those virtual objects respond to stimuli (referred to herein as the object dynamics of the virtual object.)

With reference again to FIG. 1, at the start of the control method, each of the local models of the SVEs 16 are initialized to be an identical replica of a virtual environment including one or more dynamic virtual objects, and each participant computer (12-1, for example) is allowed to locally simulate its local SVE 16-1 independently without consideration of other participants, thereby yielding ideally high responsiveness. Then, continuous change of the synchronous local models of the state of a virtual object in the SVE, including state information $x_1$ 22, and user input forces f (included in a sum-of-forces data type 24) are propagated to a remote participant computer 12-2. In this setting, at each computer, a feedback controller such as synchronization controller 26-1, implemented in software, hardware or a combination of both, operates to minimize the difference between the conveyed state and its corresponding local value. Eventually, through successive information propagation and simultaneous action of the synchronization controllers 26-1 to 26-$n$, consistency of the SVEs 16 between or among participant computers is achieved. (In client-server topologies, the virtual object state information (in the data packets) is sent to a central server rather than a peer.)

It is desirable to choose a network configuration demonstrating the smallest round-trip delay among the participating computers (i.e., the shortest circle). In order to determine the optimal configuration, a computer based search is run under the assumption that communications time delays between participants are known a priori. Time-stamping the data packets 18 helps to measure the round-trip time in real-time. Since the structure of network 10 is static, the shortest circle configuration is fixed once determined. The data packets 18, required for information exchange, are issued by a first participant 12-1 and travel along the shortest circle determined. First participant 12-1 continues to propagate data packets at regular intervals until the first data packet is returned to the first participant 12-1. Afterward, the existing, propagating packets continue circulating unless lost in transmission. Data extrapolation techniques may be employed to compensate for lost data packets.

Each data packet 18 contains all of the state information $x_1$ 22 of dynamic virtual objects in the SVE, such as position and velocity, as well as a sum of all of the forces $\Sigma f$ 24 externally input by n participating users, such that packet = {     Station 1: time, state;
                Station 2: time, state;
                ...
                Station n: time, state;
                Sum of all the external force;
}

Figure 2:
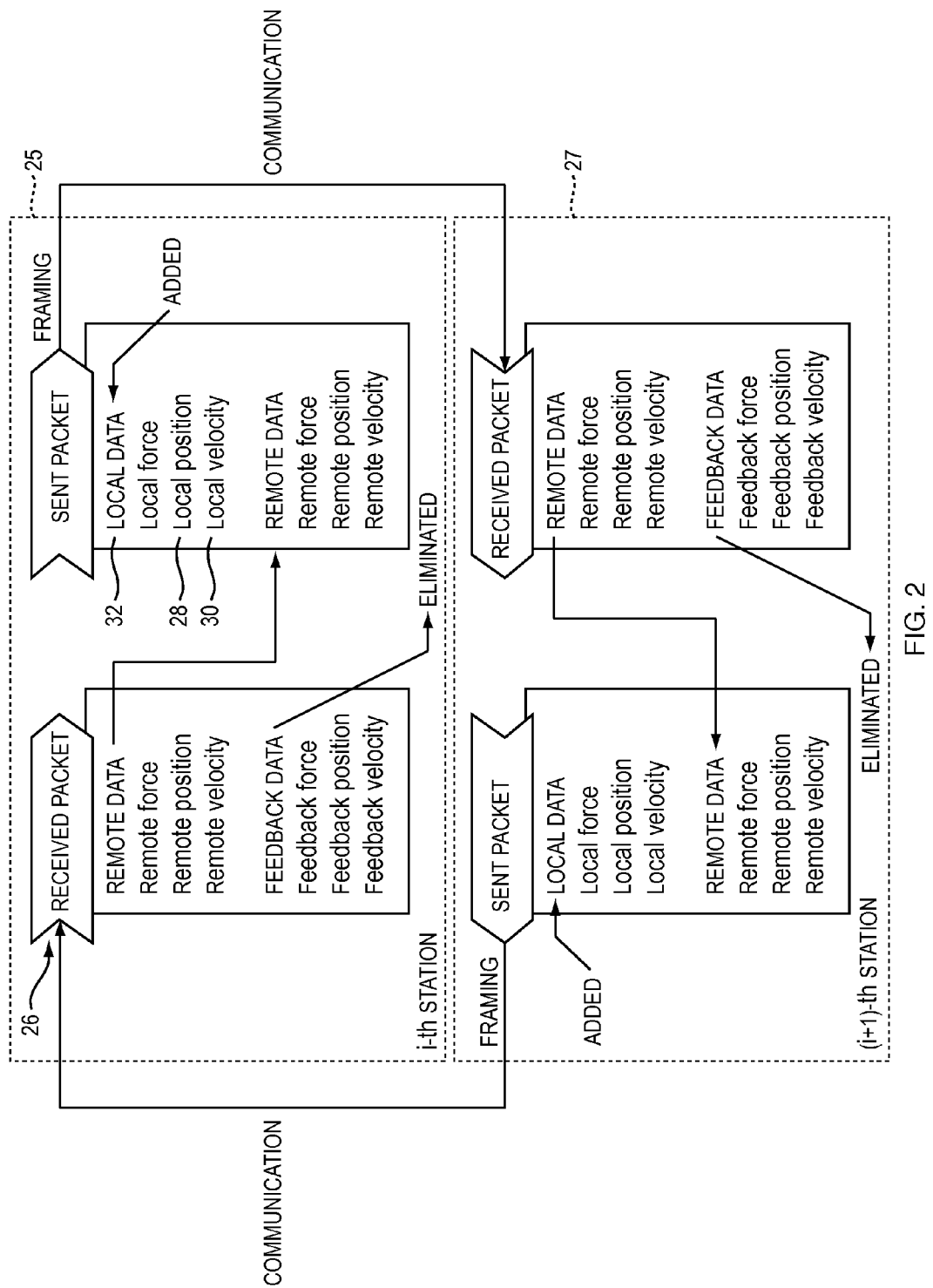
FIG. 2 is a block diagram illustrating the substitution of local data into data packets in a synchronization scheme in accordance with principles of the present invention.

With reference to FIG. 2, each time a data packet is received 26 at an i-th station 25, local position data 28 and velocity data 30 reflective of local changes induced in the synchronous model of the state of the dynamic virtual object is substituted in the data packet for the old one along with its local time (i.e., at each station, only the local data is updated.) Additionally, the sum of all the external forces $\Sigma f$ is recalculated by substituting the updated local force component 32 for its previous value in the data packet.

Two adjacent stations 25, 27 in the network act as a leader (25) and a follower (27), reversed with respect to the direction of information flow. For example, the i-th (local) station 25 is the leader of the (i+1)-th (remote) station 27. The state of the i-th station 25 acts as a desired state the (i+1)-th station 27 should follow. The problem of state difference minimization is, thus, reduced to one of feedback control, except that certain conditions are required to be met beyond state error minimization.

Figure 3:
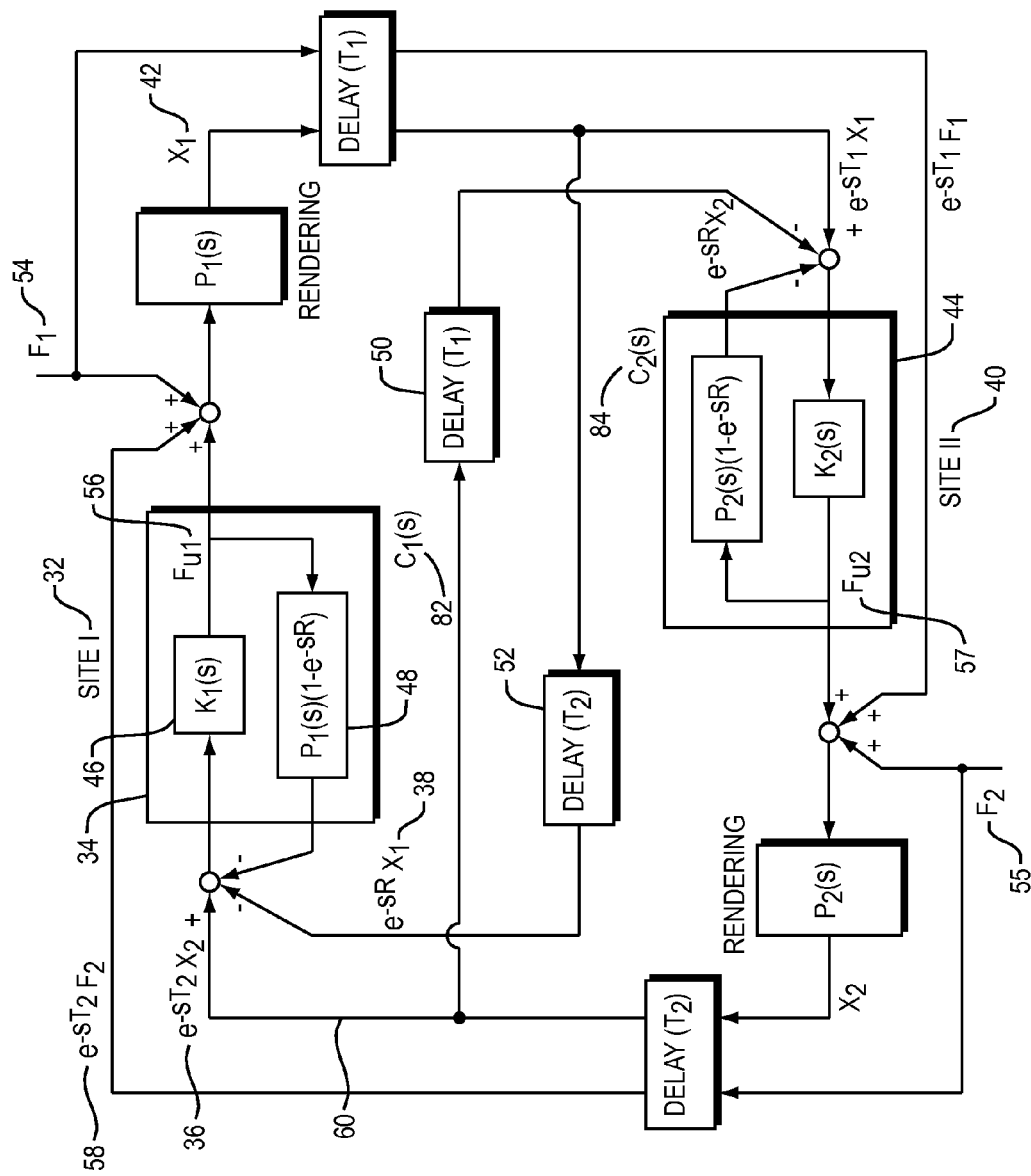
FIG. 3 is a schematic of a synchronization controller in accordance with an embodiment of the invention.

FIG. 3 is a block diagram which represents in a general way some of the key program components of the feedback controller algorithm implemented (in the embodiment described) as software executing on each computer in the network. For simplification purposes, the implementation is comprised of a two-user SVE application with a single dynamic virtual object that is moving due to external haptic interaction forces ($F_1$ 54 and $F_2$ 55) and synchronizing corrective forces ($F_{u1}(t)$ 56 and $F_{u2}(t)$ 57) under known physical dynamics such that $$m\ddot{X}_1(t) + b\dot{X}_1(t) = F_1(t) + F_2(t-T_2) + F_{u1}(t), \quad \text{Site 1:}$$

$$m\ddot{X}_2(t) + b\dot{X}_2(t) = F_1(t-T_1) + F_2(t) + F_{u2}(t), \quad \text{Site 2:}$$

where m and b are mass and damping resistance coefficient of the virtual object.

Messages received by and propagated from a participant computer, station-I 32 are coupled to the network through a program component which can be represented in a Laplacian domain as synchronization controller $C_i(s)$ 34. In this two-user embodiment, the network renders to a bilateral communication between the stations, which synchronize each other.

Synchronization controller $C_i(s)$ 34 is designed with three general design criteria:

(R1) the effect of a local user's input should be displayed instantly, (R2) the effect of feedback forces should not overwhelm the physical motions of the dynamic virtual object, and (R3) the state of dynamic objects must be consistent after transient time, and the overall structure must be stable.

Synchronization control is applied to all of the participating computers. At station-I 32 The time delayed state output $e^{-sT_2} X_2$ 36 from a previous participating computer, station-II 40, is received as an input into synchronization controller $C_i(s)$ 34, and in return the current output $X_1$ 42 of synchronization controller 34 is sent to the next participant computer, in this simplified case, station-II 40 for time-delayed input into its synchronization controller 44. Output $X_1$ 42 is allowed to propagate completely about the closed loop and returns as a time-delayed feedback data packet $e^{-sR} X_1$ 38.

Synchronization controller $C_i(s)$ 34 is comprised of two components: a linear compensator $K_1(s)$ 46, and state estimators $P_1(s)$ and $P_1(s)e^{-sR}$ (illustrated as Smith predictor 48 based internal model of the virtual object's dynamics), where $K_1(s) = k_{v1}s + k_{p1}$ is a proportional derivative (PD) controller having a velocity gain $k_v$ and a proportional constant gain $k_p$, $P_1(s)$ comprises the virtual reality object dynamics of the virtual object being acted upon by the user, and $e^{-sR}$ denotes the closed loop round-trip time delay R (in this case, the sum of delays $T_1$ 50 and $T_2$ 52) in the Laplace domain representation. Linear compensator $K_1(s)$ 46, being a simple PD controller, compensates for the state difference between the reference time delayed state output $e^{-sT_2} X_2$ 36 from station-II 40 and the time-delayed feedback value $e^{-sR} X_1$ 38, while the state estimators play more complicated roles.

In order to meet design criteria (R1) in a network with time delays, the output of synchronization controller $C_i(s)$ 34 is not instantly fed back, but must be fed back after the round trip time. Since user input force $F_1$ 54 is the disturbance to the point of the controller 34, if direct feedback were to be used any disturbance effect may be compensated. Therefore, feeding back output $X_1$ 42 of synchronization controller $C_i(s)$ 34 after a round trip delay presents the local user with an immediate display of the response to his action, without being affected by the immediate feedback compensation. Furthermore, the feedback after the round trip time matches the input force timing of the reference time delayed state output $e^{-sT_2} X_2$ 36 from station-II 40.

On the other hand the effect of corrective input $F_{u1}$ 56 should be reflected immediately, in order that the state difference can be compensated instantly, in accordance with design criteria (R2, R3). So, the corrective input force $F_{u1}$ 56 (only) is directly fed back through $P_1(s)$ in the control loop. This permits the synchronization controller $C_i(s)$ 34 to know how much the output is corrected.

Finally, feedback of a time-delayed corrective input force $F_{u1}$ 56 (the $e^{-sR}$ component of the Smith predictor 48) is added to negate the controller effect to the feedback state, resulting in pure output representing the user's force input. This feedback is applied to comply with stability requirement (R3). As noted above, a real-time measured round-trip time R can be calculated via the time-stamps applied to the data packets. With R measurement, this third feedback becomes possible in combination with a queue of the previous values of the second feedback, directly fed back corrective input force $F_{u1}$ 56.

Thus, the system transfer function of synchronization controller $C_i(s)$ 34 is given by $$C_i(s) = \frac{(ms^2 + bs)(k_v s + k_p)}{ms^2 + (b + k_v)s + k_p - e^{-sR}(k_v s + k_p)},$$

and the corrective synchronizing forces are determined by $$F_{u1} = \frac{(ms^2 + bs)(k_v s + k_p)}{ms^2 + (b + k_v)s + k_p - e^{-sR}(k_v s + k_p)}(e^{-sT_2}X_2 - e^{-sR}X_1)$$

$$F_{u2} = \frac{(ms^2 + bs)(k_v s + k_p)}{ms^2 + (b + k_v)s + k_p - e^{-sR}(k_v s + k_p)}(e^{-sT_1}X_1 - e^{-sR}X_2)$$

$$\begin{bmatrix} X_1 \\ X_2 \end{bmatrix} = \begin{bmatrix} (h_{11} + h_{12}e^{-sT_1})(h_{11}e^{-sT_2} + h_{12}) \\ (h_{21} + h_{22}e^{-sT_1})(h_{21}e^{-sT_2} + h_{22}) \end{bmatrix} \begin{bmatrix} F_1 \\ F_2 \end{bmatrix},$$

where $$h_{11} = \frac{(ms^2 + (b + k_v)s + k_p)\{ms^2 + bs + (1 - e^{-sR})(k_v s + k_p)\}}{(ms^2 + bs)\{(ms^2 + (b + k_v)s + k_p)^2 - (k_v s + k_p)^2 e^{-sR}\}}$$

$$h_{12} = \frac{e^{-sT_2}(k_v s + k_p)\{ms^2 + bs + (1 - e^{-sR})(k_v s + k_p)\}}{(ms^2 + bs)\{(ms^2 + (b + k_v)s + k_p)^2 - (k_v s + k_p)^2 e^{-sR}\}}$$

$$h_{21} = \frac{e^{-sT_1}(k_v s + k_p)\{ms^2 + bs + (1 - e^{-sR})(k_v s + k_p)\}}{(ms^2 + bs)\{(ms^2 + (b + k_v)s + k_p)^2 - (k_v s + k_p)^2 e^{-sR}\}}$$

and $$h_{22} = \frac{(ms^2 + (b + k_v)s + k_p)\{ms^2 + bs + (1 - e^{-sR})(k_v s + k_p)\}}{(ms^2 + bs)\{(ms^2 + (b + k_v)s + k_p)^2 - (k_v s + k_p)^2 e^{-sR}\}}.$$

Note that the characteristic function is combined with simple polynomial and exponential functions such that $$\varphi(s) = (ms^2 + bs)\{(ms^2 + (b + k_v)s + k_p)^2 - (k_v s + k_p)^2 e^{-sR}\}$$

III. Stability and Robustness Analysis

Walton and Marshall's method provides a convenient way to examine the stability of the described system. (K. Walton and J. E. Marshall, "Direct method for tds stability analyses," *IEEE Proceedings: Part D*, vol. 2, no. 2, pp. 101-107, 1987, incorporated herein by reference.)

Theorem 1. For the closed loop system, $\exists$ a constant $R_{MAD} > 0$ such that (i) the closed loop system has bounded stability if $0 < R \leq R_{MAD}$, and (ii) $\Delta X \to 0$ as $t \to 0$ if $F_1(t) = F_2(t) = 0 \forall t \geq t_0$.

For the two-user system described above, with a virtual object with a mass $m = 1$ and the damping resistance coefficient $b = 0$, the solution for the maximum allowable delay reduces to $$R_{1,0} = 4 \tan^{-1}\left(\bar{k}_v \sqrt{\frac{2}{\bar{k}_p}}\right) / \sqrt{2k_p}.$$

Figure 4:
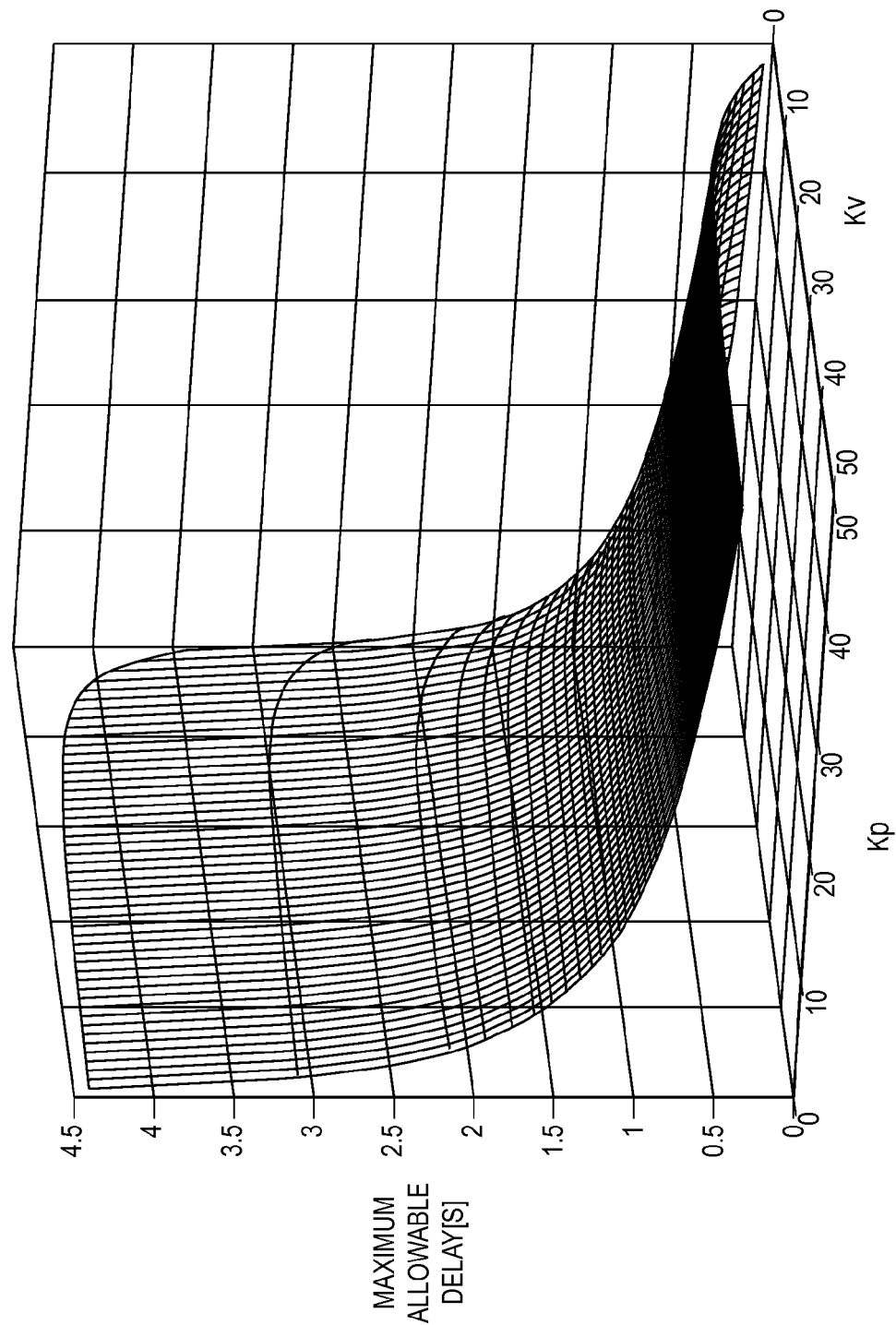
FIG. 4 is a three-dimensional plot of maximum allowable delay, $R_{MAD}$, for a particular embodiment of a synchronized network in accordance with principles of the invention.

Thus, the overall system shows exponential stability under the condition that the actual round trip time R is bounded by the maximum allowable delay $R_{MAD}$. FIG. 4 is a plot of the stability bounds for this system, and relates the velocity gain $k_v$ and proportional constant gain $k_p$ of the linear compensator $K(s)$ to the maximum allowable delay $R_{MAD}$. Stable system conditions can now be found by substituting numerical values into the system parameters. According to the result, $R_{MAD}$ tends to increase as the control gains become smaller. This means that a large communications delay shrinks the stable bound of the control gains. Since the speed of the closed loop response is usually proportional to the magnitude of the control gains, if the delay is large, the speed of the response would be reduced.

IV. Recovery Filter

Referring again to FIG. 3, the application of synchronization control (represented by the closed inner loop) inevitably changes the natural motion of the dynamic virtual object. If the amount of change is large, the user may perceive the motion of the object as unnatural. Thus, an optional, but highly preferred, additional compensatory means, referred to herein as a recovery filter, may be employed to recover the original natural motion. The user's input force $F_1$ 54 is augmented by the recovery filter. Since the recovery filter, represented in the two-user embodiment by augmenting force $e^{-sT_2}$ $F_2$ 58, is placed outside of the closed loop 60, the stability and robustness properties will be unaffected.

Quantifying how much the synchronization controller $C_i(s)$ 34 changes the natural motion is a first step toward recovery filter design. For the situation where $F_1 \neq 0$ and $F_2 = 0$, $$X_1 = P_1(s)D_1(s)F_1$$

$$X_2 = e^{-sT_1} \cdot P_2(s)D_2(s)F_1,$$

where $$D_1(s) \triangleq \frac{(ms^2 + (b + k_v)s + k_p)^2 - (k_v s + k_p)^2 e^{-2sR}}{(ms^2 + (b + k_v)s + k_p)^2 - (k_v s + k_p)^2 e^{-sR}},$$

$$D_2(s) \triangleq \frac{(ms^2 + (b + 2k_v)s + 2k_p)(ms^2 + bs + (1 - e^{-sR})(k_v s + k_p))}{(ms^2 + (b + k_v)s + k_p)^2 - (k_v s + k_p)^2 e^{-sR}}.$$

It is noted that $D_1(s)$ and $e^{-sT_1}D_2(s)$ represent the deviation of the object motion from its natural motion. With $D_1 = e^{-sT_1}D_2 = 1$, the object has no deviation from the natural motion. Now, suppose a new filtered input $F_{f1}(s)$ is defined as $$F_{f1}(s) \triangleq L(s)F_1,$$

where $L(s)$ is a filter transfer function. If we apply $F_{f1}$ to the system instead of $F_1$, new input-output relations become:

$$X_1 = P_1(s)D_1(s)F_{f1} = P_1(s)D_1(s)L(s)F_1$$

$$X_2 = e^{-sT_1} \cdot P_2(s)D_2(s)F_{f1} = e^{-sT_1} \cdot P_2(s)D_2(s)L(s)F_1.$$

In order to give the user at site-I (who has introduced $F_1$ physically) a natural perception of the object's motion, $L(s)$ needs to be designed so as to minimize $$\|1 - D_1(s)L(s)\|.$$

And because $D_1(s)$ behaves like a lag compensator, $L(s)$ is chosen as a lead compensator of the form $$L(s) = \frac{s + 1/T}{s + 1/(\gamma T)}, (\gamma < 1),$$

where T and $\gamma$ are positive filter parameters, $$\gamma = 1/\lim_{w \to 0} |D_1(jw)|$$

the frequency $\omega_m$ at which a maximum phase delay occurs in $D_1(j\omega)$ determines T, and is given by $$w_m = \frac{1}{\sqrt{\gamma\ T}}.$$

V. Software Implementation

The data packet transmission control, synchronization controller and recovery filter for a particular SVE are written in a software language specifically for the purpose. The scripting language may be a full-featured programming language much like Java or C++, allowing the scriptwriter to use control constructs, data structures, complicated state variables and the like which allows changing the appearance of objects, play sounds, move things around, create and destroy inventory items, modify state variables, pop up dialog boxes, alter player statistics, play animation, and in general, control every aspect of the virtual environment. This section briefly describes how to implement the synchronization control algorithm, the steps of which are summarized in FIG. 5. Here a rough sketch of computer code in the i-th station is provided. It will be assumed, for explanatory purposes, that there is only one dynamic object to simulate and the dynamics are given by $$M\ddot{x} + N(x,\dot{x}) = \sum_{k=1}^{n} f_k,$$

where M, N(x,ẋ), and $$\sum_{k=1}^{n} f_k$$

are the inertia, other dynamic force, and sum of all the external forces, respectively.

```
Data packet in_message, out_message;
//data type for data packets
void main( )
{
    initialize_setting( ); //initialize
    while (!end) {
        receive_data (i−1, in_message);
        //receive packet from (i−1)-th station
        calculate_controller( );
        //calculate control force
        do_simulation( );
        //calculate output, do graphic rendering
        send_data(i+1, out_message):
        //send data packet to (i+1)-th station
        time = time + time_step;
        //forwarding simulation time
    }
)
...
double calculate_controller(void)
{
    rtt = current_time − in_message.time[i]; // compute rtt
    feedback_pos = in_message.position[i]; // feedback position
    reference_pos = in_message.position[i−1]; // reference position
    feedback_vel = in_message.velocity[i]; // feedback velocity
    reference_vel = in_message.velocity[i−1]; // reference velocity
    error = reference_pos − feedback_pos −
        estimate_pos[0] − estimate_pos[rtt];
    error_vel = reference_vel − feedback_vel −
        estimate_vel[0] − estimate_vel[rtt];
    // estimate_pos and estimate_vel are queues that hold previous
    // values of state by the control force only
    control_force = k_v*error_vel + k_p*error; // controller
    return (control_force)
}
...
double do_simulation(void)
{
    rtt = current_time − in_message.time[i]; // compute rtt
    local_force = recovery_filter(raw_local_force)
    sum_force = in_message.sum_force;
    sum_force = sum_force − local_force[rtt] + local_force[0];
    // local force is a queue
    acceleration = (control_force + sum_force +
        other_dynamic_force)/inertia;
    velocity = velocity + acceleration*time_step;
    position = position + velocity*time_step;
    graphics_render(position);
    estimate_acc = (control_force + nonlinear_force)/inertia;
    estimate_vel = estimate_vel + estimate_acc*time_step;
    estimate_pos = estimate_pos + estimate_vel*time_step;
    put_in_queue(estimate_vel);
    put_in_queue(estimate_pos);
}
...
void send_data(out_message)
{
    copy(in_message, out_message);
    out_message.time[i] = current time;
    out_message.sum_force = sum_force;
    out_messge.position[i] = position;
    out_message.velocity[i] = velocity;
    // information update shown in FIG. 2
}
...
```

VI. Experimental Results

Figure 6:
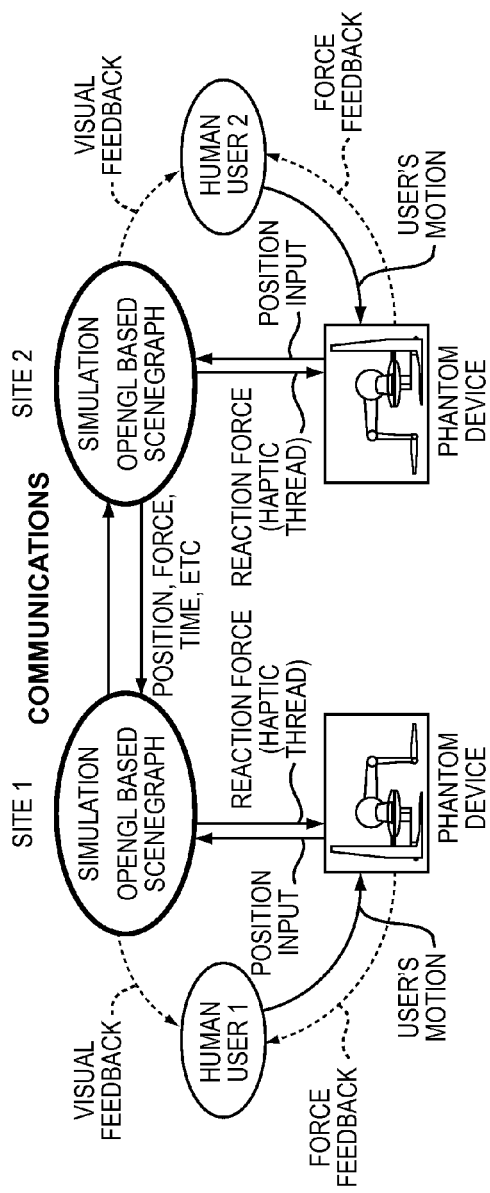
FIG. 6 is a schematic of an experimental setup for a two-user SVE system.

Two experiments using real Internet and LAN communications were carried out. These tests clearly support the validity of the analyses and demonstrate the applicability of the synchronization controller. The first experiment demonstrates the performance and stability of the synchronization control over a long distance Internet communication without human users involved, while the second experiment shows the synchronization performance with human users interacting in a sample SVE over the LAN communication. A schematic of the test configuration is shown in FIG. 6.

A. Experiment One

In the first study, information exchange occurred between MIT (Cambridge, Mass.) and the Pohang University (Pohang, Korea.) UDP streaming was applied, since prompt delivery was more important than inaccuracies that might have been introduced by possible data packet disorder and data loss. No haptic devices were used to generate the forces and displacements. Instead, modeled forces were simulated, with $$F_1(t) = -\sin(1.8(t-5)): \text{MIT site}$$

$$F_2(t) = \sin(1.0(t-5)+1): \text{POSTECH site}.$$

The shared dynamic object utilized was a cube that has mass and damping resistance, with values of m=1 and b=0. The gains of the synchronization controller were selected to be $k_p$=20 and $k_v$=6 such that the closed loop system's stability is obtained with a maximum delay of $R_{MAD}$=574 ms.

Figure 7A:
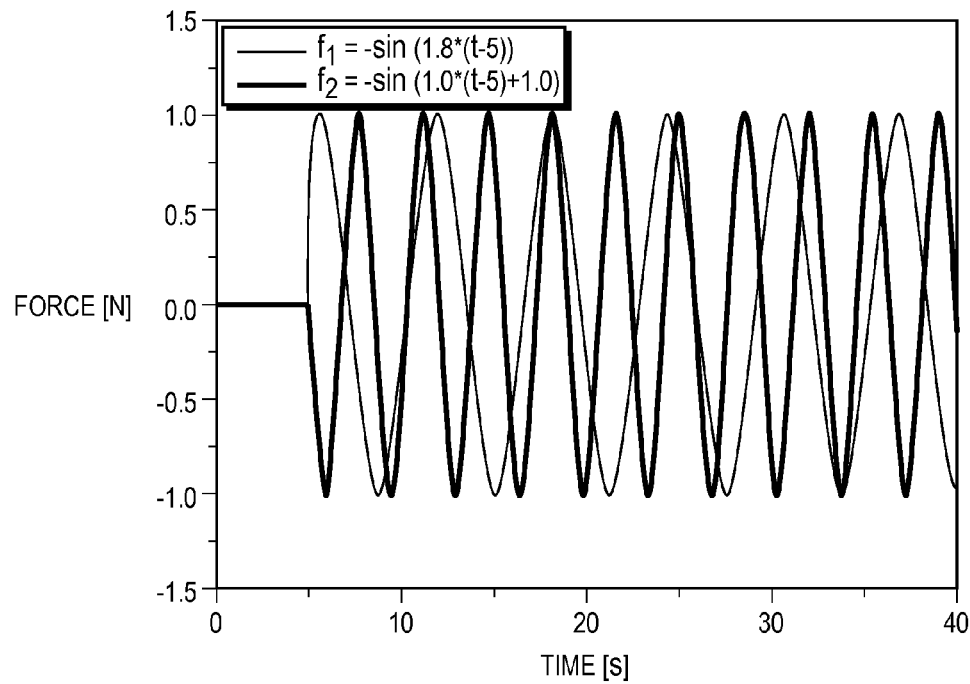
FIGS. 7A-7D are plots of experimental results for a synchronization experiment testing performance and stability over long distance Internet communications.
Figure 7B:
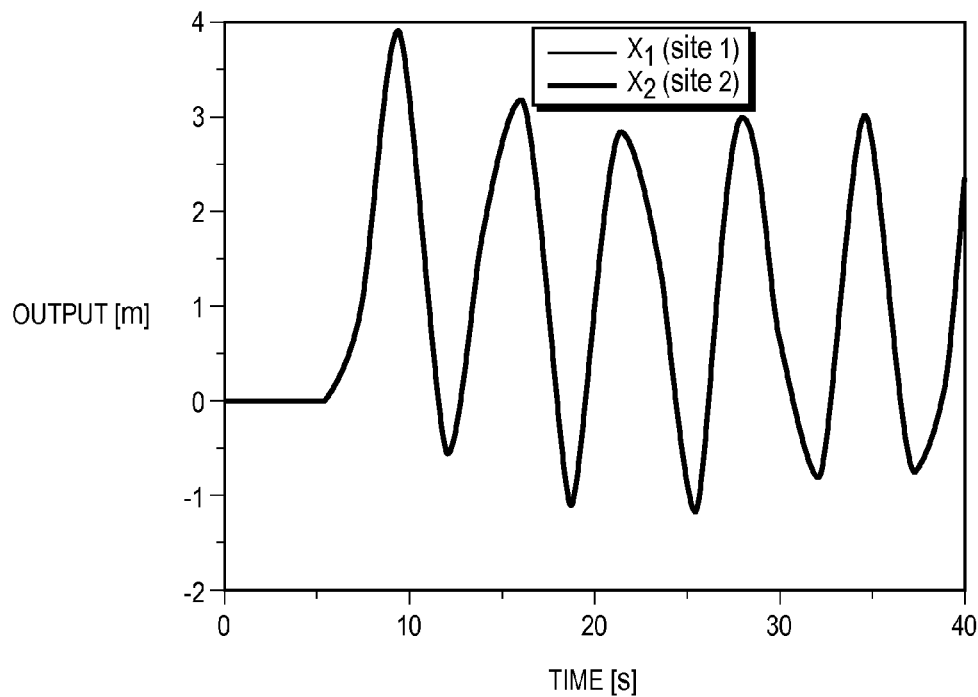
Figure 7C:
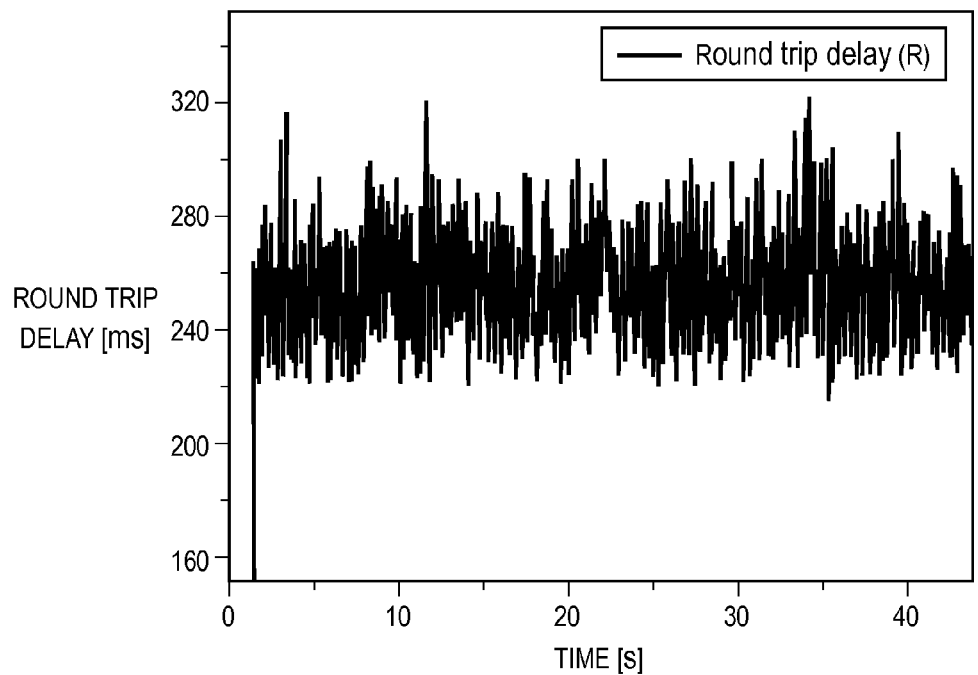
Figure 7D:
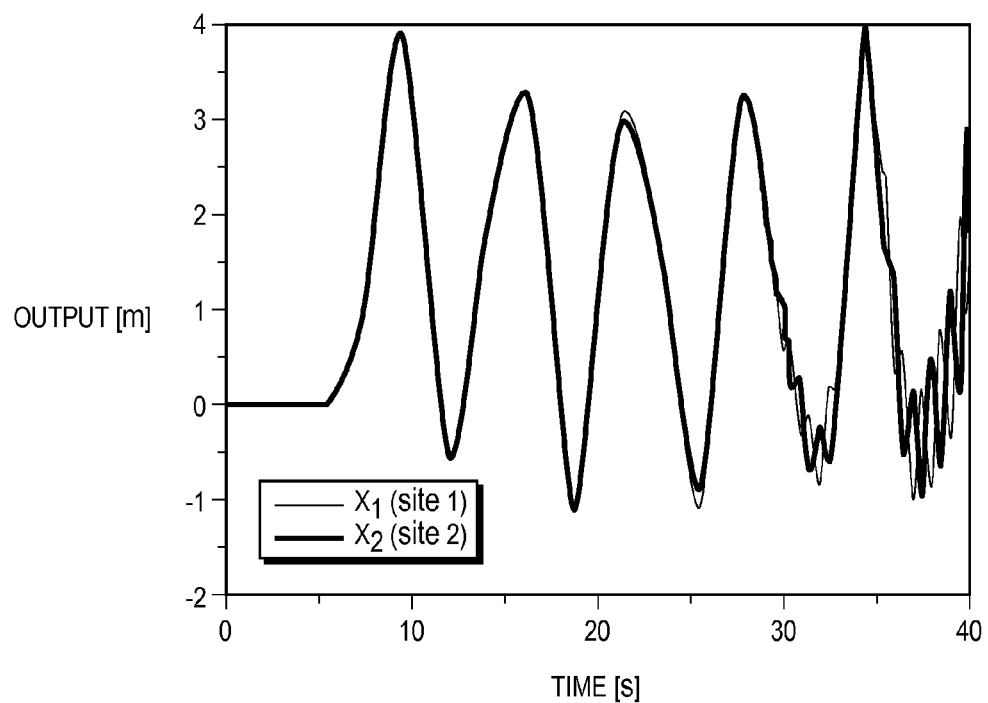

The corresponding forces $F_1$ and $F_2$ and two outputs $X_1$ and $X_2$ are shown in FIGS. 7A and 7B, respectively. These Figures clearly show that very good synchronization has been achieved. Noting the $R_{MAD}$ was 547 ms is very conservative compared to the actual delay R (shown in FIG. 7C.) Further experiments were performed for different values of $k_v$. As $k_v$ became smaller, the performance was slightly degraded, and instability was observed for $k_v=1.5$, which was a far more aggressive choice of $R_{MAD}=256$ ms. The resulting response is shown in FIG. 7D.

B. Experiment Two

In the second experiment, two sites were connected to a LAN where the time delay was only a few milliseconds, therefore an artificial delay was introduced between the sites in order to simulate long distance communications. In both sites, an identical haptic device (a Phantom from Sensable Technologies, Inc.) was used to manipulate a solid virtual cube, comprising the dynamic virtual object. Two separate experiments of (i) independent motions and (ii) cooperative motions of the haptic devices. The other required parameters of the experiments are shown in Table 1. The synchronization controller parameters were chosen as $k_p=2$, $k_v=2$, and $R_{MAD}=2218$ ms.

TABLE 1

Parameters of the virtual environment

| contents | value | units |
|---|---|---|
| Cube's mass (m) | 1 | [kg] |
| Damping coeff. (b) | $2 \times 10^{-3}$ | [N · s/m] |
| Work space | $150 \times 130 \times 130$ | [mm$^3$] |
| Restitution coeff. | 0.7 | no unit |

(i) Independent Motion of the Haptic Devices

Two participants were placed in different rooms, and were each asked to push and hit the cube arbitrarily using the haptic device, independent of the motion of the other device.

Figure 8A:
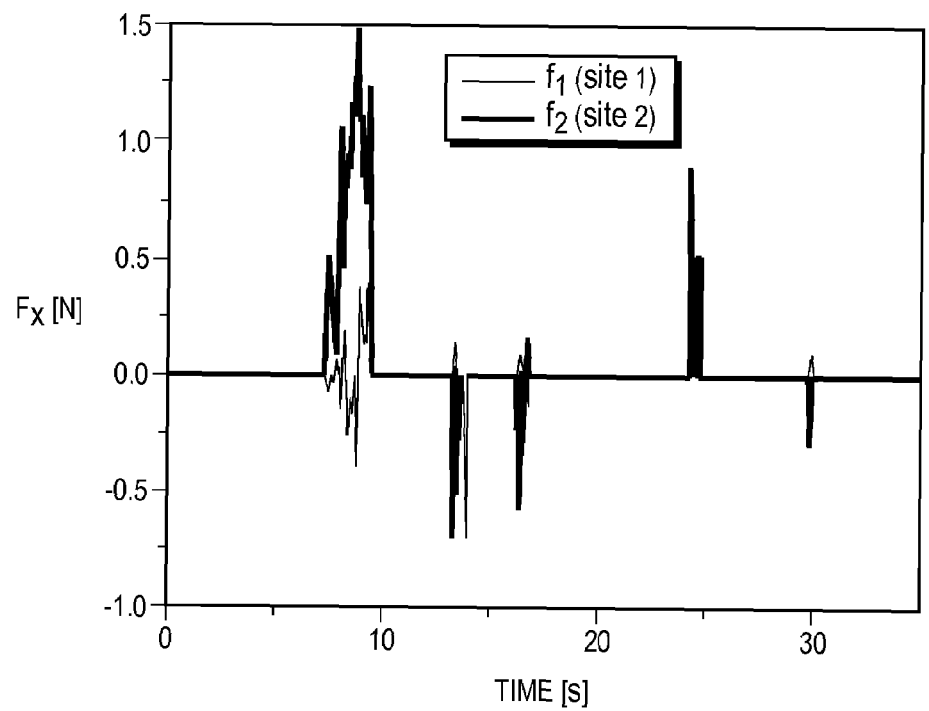
FIGS. 8A-8D are plots of experimental results of synchronization performance testing with users interacting in a sample SVE over a LAN, with and without synchronization in accordance with an embodiment of the invention.
Figure 8B:
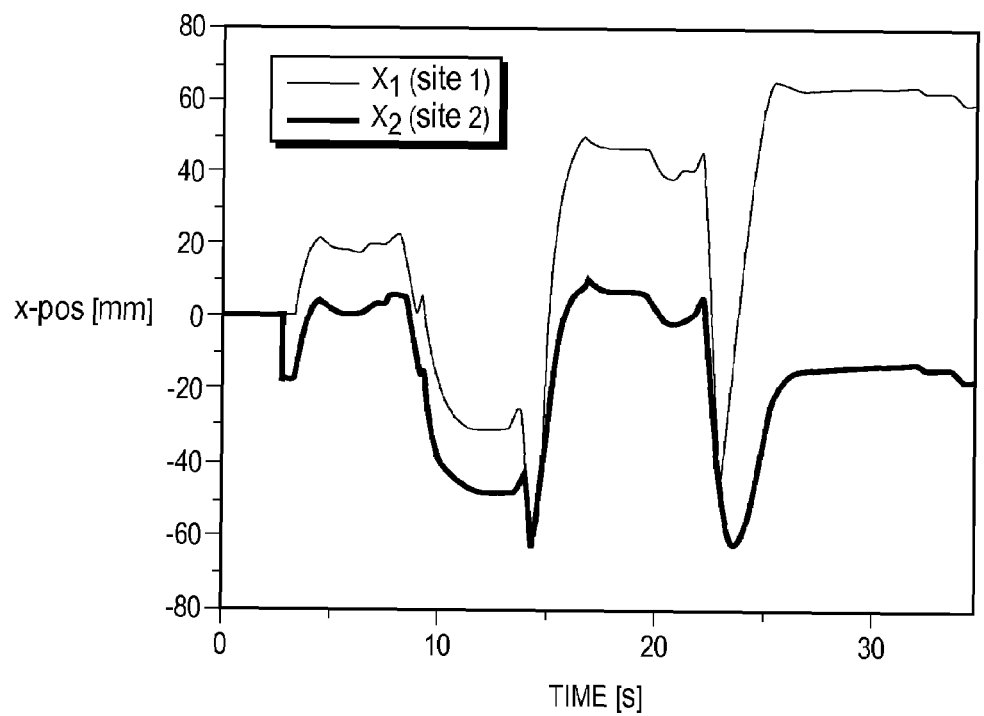
Figure 8C:
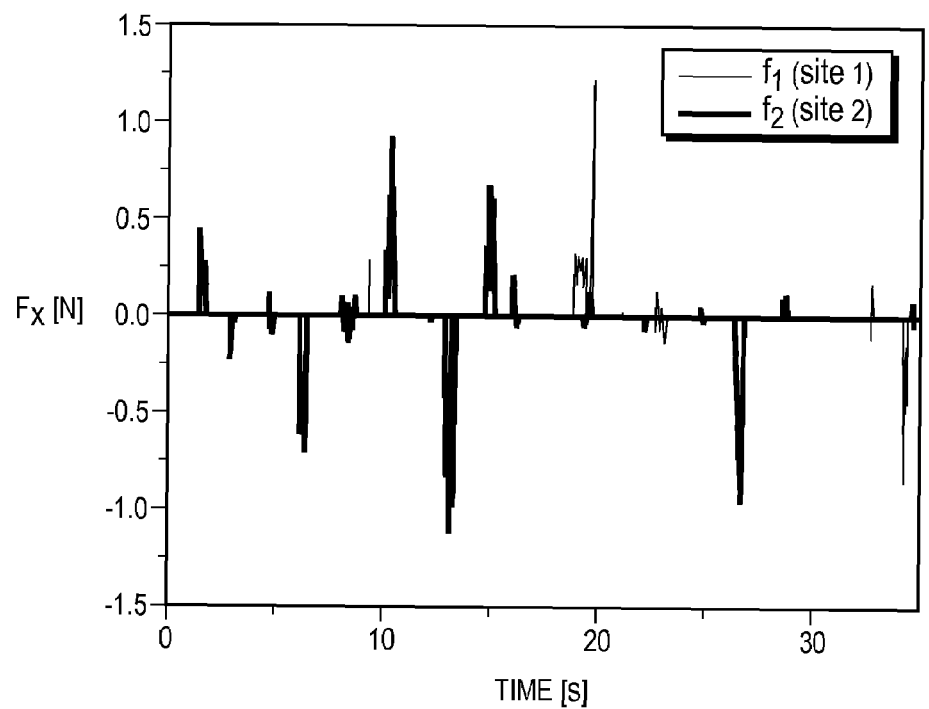
Figure 8D:
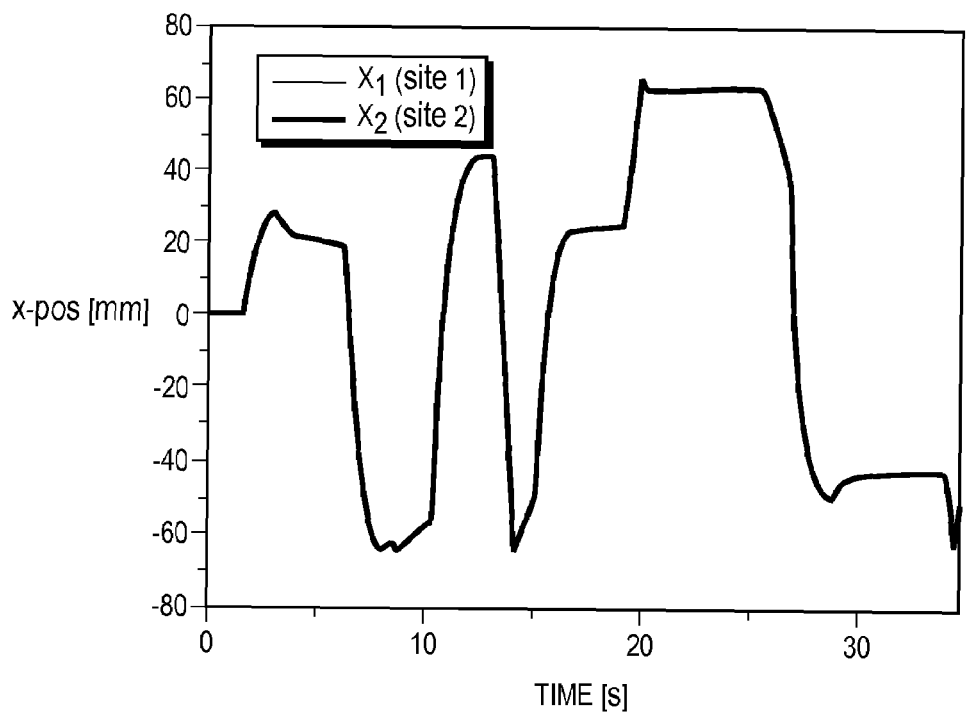
Figure 9A:
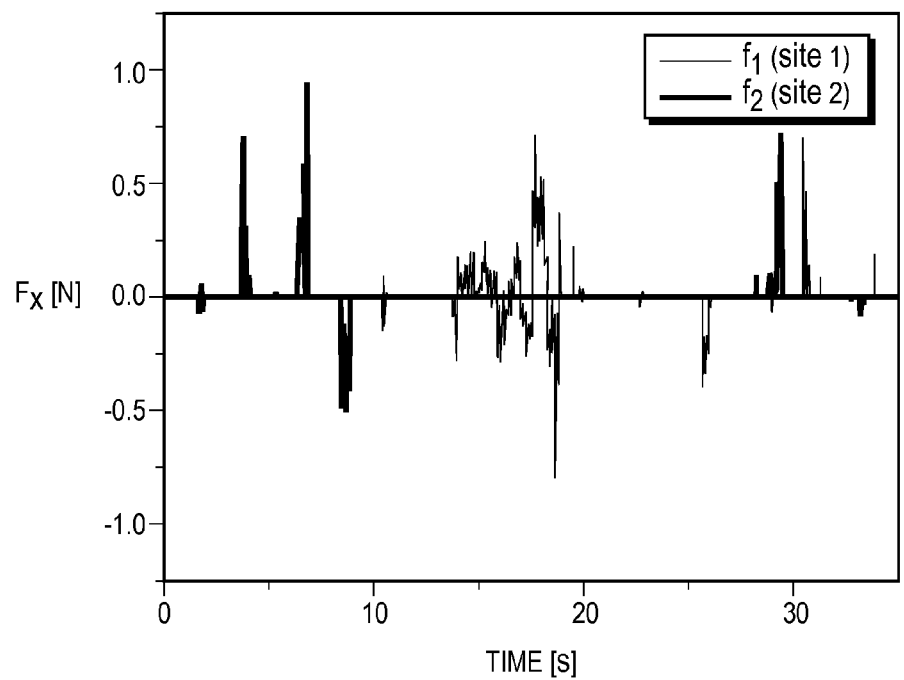
FIGS. 9A-9D are plots of experimental results of random-input synchronization testing conducted with different induced delays.
Figure 9B:
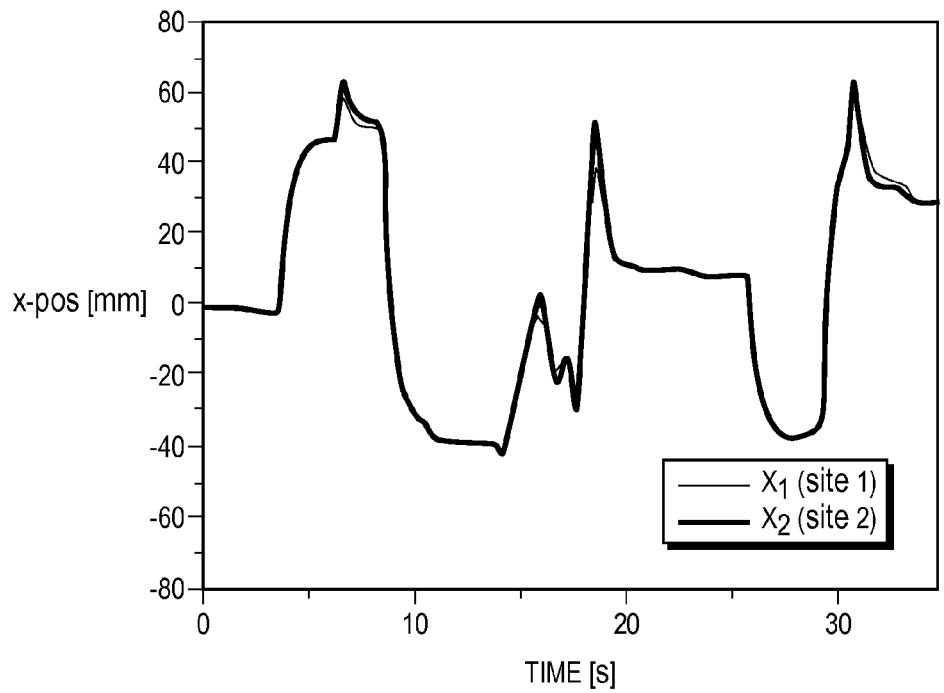
Figure 9C:
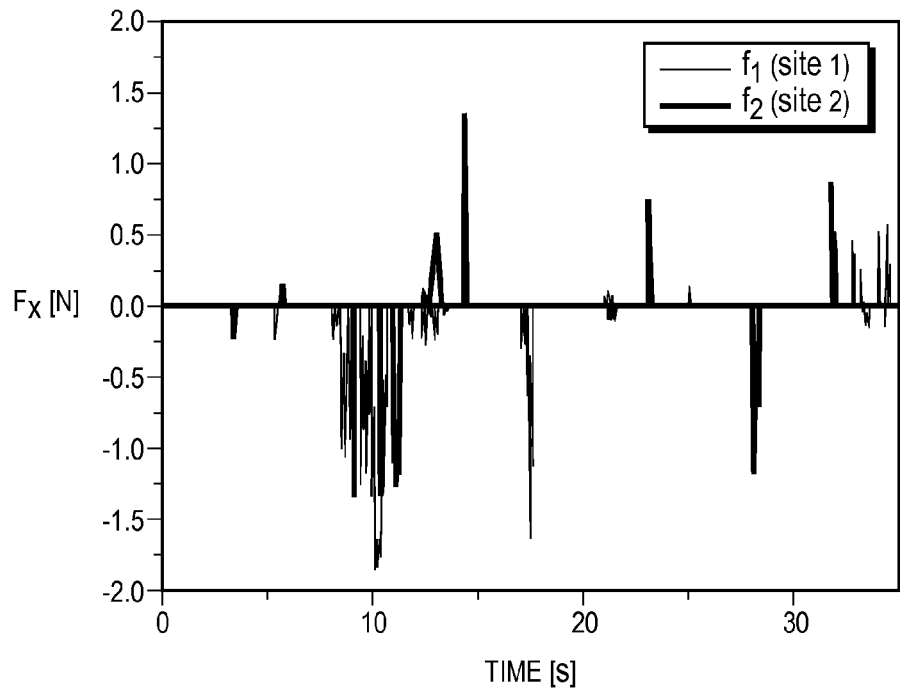
Figure 9D:
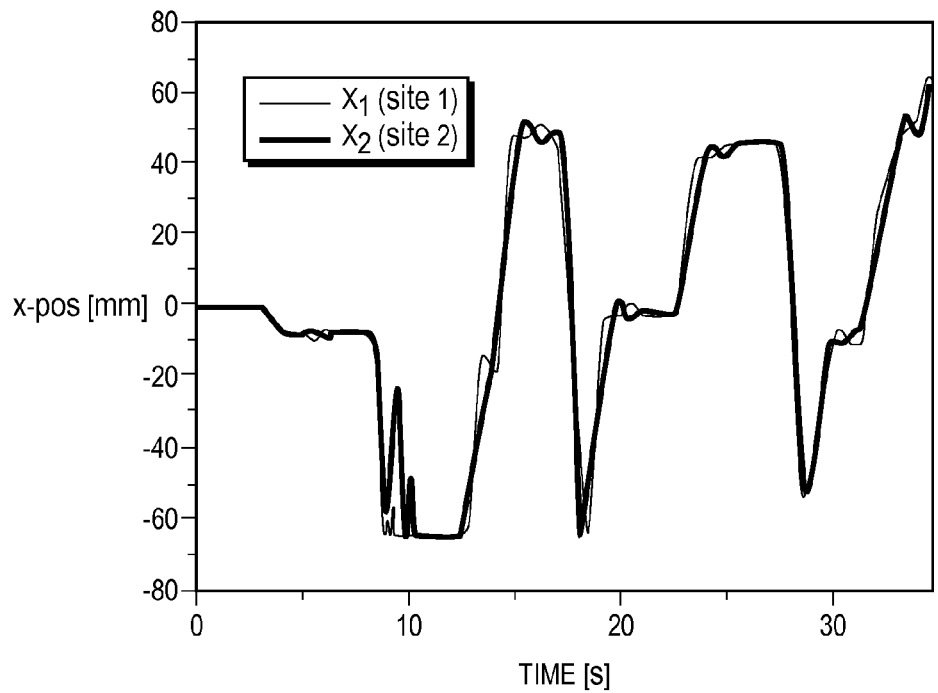

A reference test was first conducted with the synchronization control turned off. That is, $F_{u1}=F_{u2}=0$ for R=100 ms. The resulting force and position response in the x-coordinate direction are shown in FIGS. 8A and 8B, respectively, which illustrates that large state inconsistency is observed between the two sites as the users' forces are applied. Under the same test conditions, the synchronization controller was activated. The resulting force and position responses are illustrated in FIGS. 8C and 8D, respectively. As can be seen, very little state discrepancy exists between the two sites.

Further experiments with random input and different time delays were conducted, with the results shown in FIGS. 9A-9D. When R was set to 200 ms, both sites remained well synchronized, except for a few transitions. Even when R=400 ms, the synchronization controller still worked, except that the transient lasted longer and the overall motion was not as smooth as in the case with smaller time delays.

(ii) Cooperative Motion of the Haptic Devices

Figure 10A:
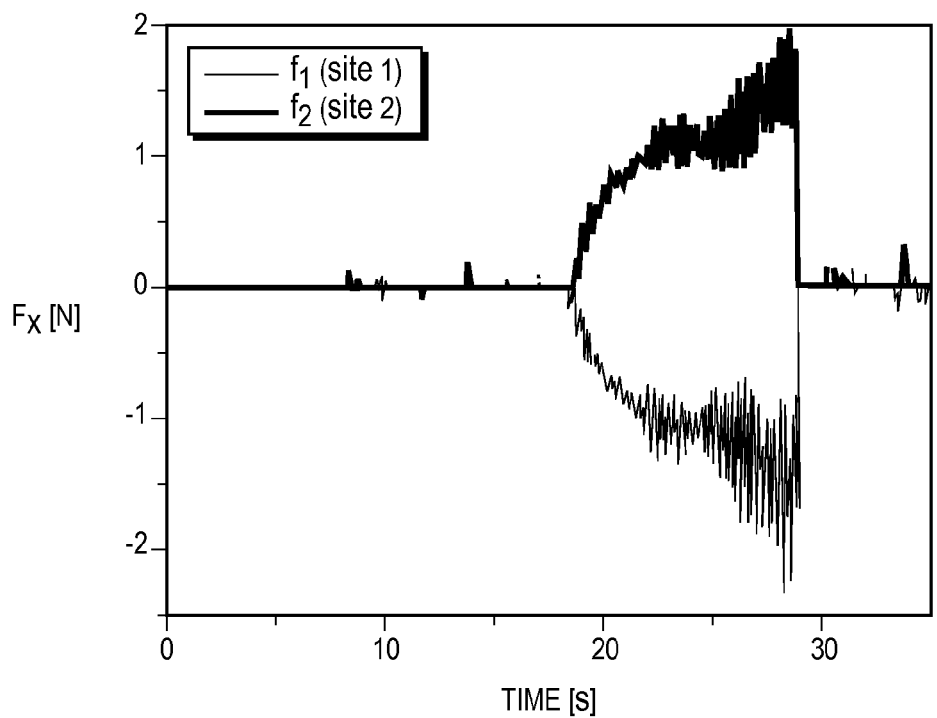
FIGS. 10A-10D are plots of experimental results of collaborative haptic interaction testing with synchronization control.
Figure 10B:
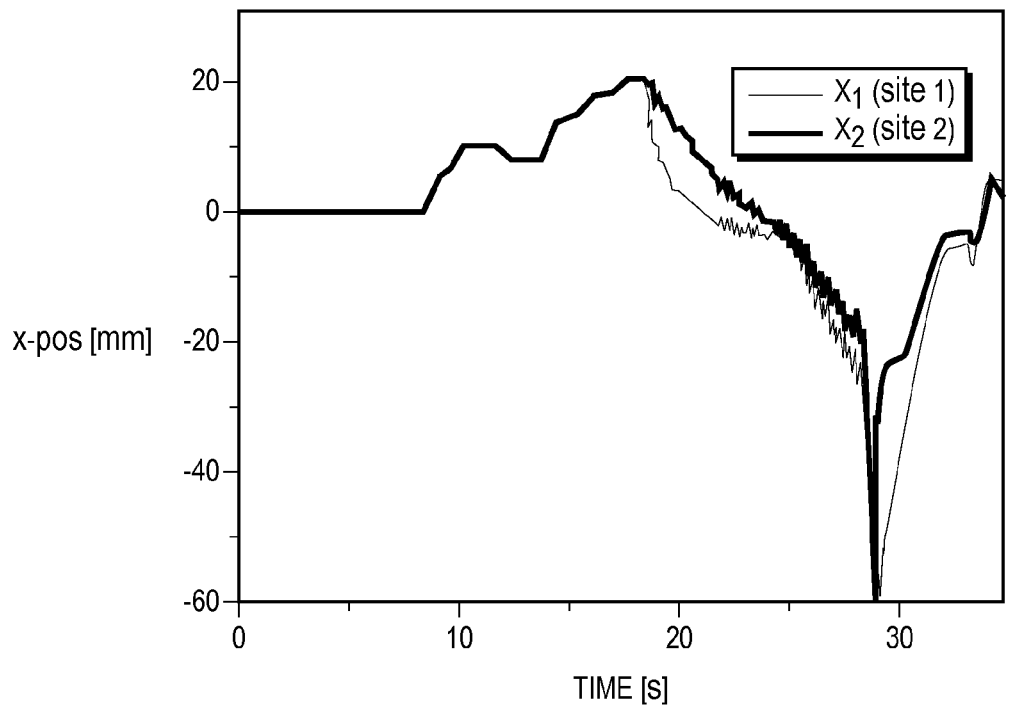
Figure 10C:
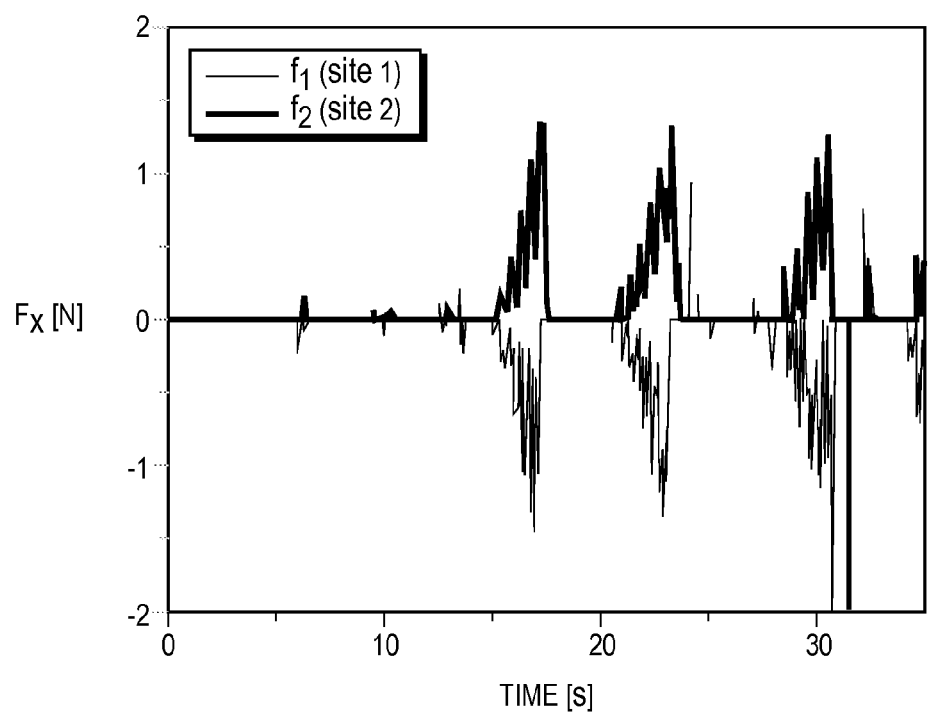
Figure 10D:
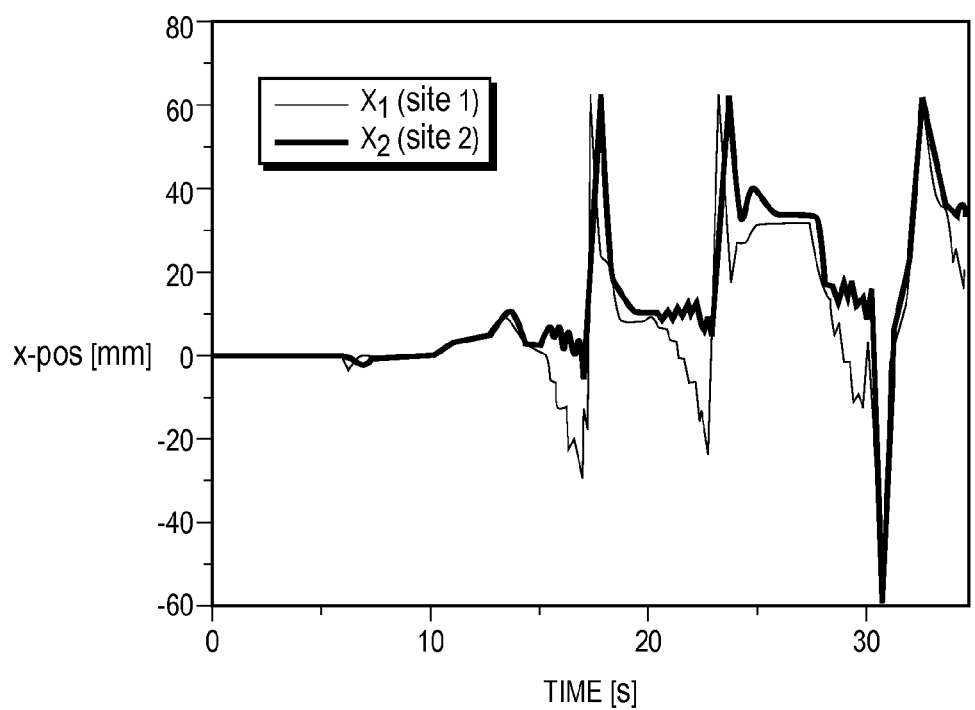

In this experiment, the two users were asked to hold the cube collaboratively by exerting forces in the opposite directions along the x-axis, similar to a "tug-of-war" game except for the application of compressive force rather than tensile forces. The resulting responses are shown in FIGS. 10A-10D, for a delay of R=120 ms and R=240 ms. In the case of R=120 ms, as seen in FIG. 10A, for the first 10 seconds, contact with the cube is barely made. Following this time, very small forces were applied by both participating users for the next 10 seconds, causing a slight positive motion of the cube, while maintaining synchronized behavior (that is, $X_1=X_2$). After t=18.5 sec, a firm contact is made with the cube at which time, equal and opposite forces are applied by the users. While from t=18.5 s to t=24 s, a very good "tug-of-war" ensues, while after t=24 s, these forces become somewhat oscillatory, which is primarily due to the natural feedback in the human's sensory motor system. As the oscillation amplitude increased, it was observed that the users' comfort level deteriorated, leading finally to a release of contact with the cube at 29 s.

Although the invention has been described with respect to various embodiments, it should be realized this invention is also capable of a wide variety of further and other embodiments within the spirit of the invention.

We claim:

1. Method of synchronizing the evolving state of a dynamic object in a shared virtual environment among a plurality of geographically separated computers connected in a communications network including data communications links introducing time delays in the propagation of data between said computers, each computer connected to input means permitting a user to interact with a virtual environment, comprising the steps of:

simulating, at each computer of said plurality of computers, a synchronous local model of a state of a dynamic virtual object in a shared virtual environment (SVE), each synchronous local model of said dynamic virtual object state being initially identical;

permitting users of one or more computers of said plurality of computers to interact via said input means with the corresponding one or more synchronous local models of said dynamic virtual object state so as to induce one or more local changes in said corresponding one or more synchronous local models of said dynamic virtual object state;

propagating from each computer sequences of data packets indicative of the synchronous local model of said dynamic virtual object associated with said propagating local computer to a remote computer in said network, the sequences of data packets being propagated along said communications links thereby introducing time delays into the propagation;

receiving at each computer said sequences of data packets propagated from another computer, said sequences of data packets having time delays from said propagation over said communication links;

compensating at each computer for dynamic virtual object state errors resulting from user inputs at said one or more computers and from said time delays by minimizing the differences between the corresponding local model of said dynamic virtual object state and the one or more induced local changes in dynamic virtual object state as indicated by the received time delayed data packets while maintaining consistency within a tolerable bound between said one or more computers; and providing each of said one or more users with feedback reflecting an error-compensated, locally-simulated model of said dynamic virtual object state in said SVE.

2. The method of claim 1, wherein the compensating step further comprises generating, at each computer, corrective control forces that reduce the state differences between each of said local models of said virtual object states and the one or more induced local changes in virtual object state as indicated by the received time delayed data packets with a synchronization controller.

3. The method of claim 2, wherein:

said synchronization controller is comprised of a linear compensator and a state estimator;

said linear compensator receiving at its input the difference between the one or more induced local changes in virtual object state contained in the time delayed data packets received from said another computer and the sum of feedback including data packets output by the local computer having been circulated completely about the network and the output of said state estimator; and said state estimator accepting as input the output of the linear compensator, said state estimator based upon a Smith predictor model $P_i(s)(1-e^{-sR})$, where $P_i(s)$ comprises the virtual reality object dynamics of said virtual object, and $e^{-sR}$ denotes the round trip delay R in the Laplace domain representation taken by a data packet to propagate completely about the plurality of computers.

4. The method of claim 2, further comprising the step of approximating via stability analysis said tolerable bound of round trip delay, $R_{MAD}$, per $$R_{MAD} = 4\tan^{-1}\left(\bar{k}_v \sqrt{\frac{2}{\bar{k}_p}}\right) / \sqrt{2\bar{k}_p},$$

wherein $\bar{k}_v$ represents the velocity control gain $k_v$ of said linear compensator normalized by the mass of the virtual object, and $\bar{k}_p$ represents the proportional constant control gain $k_p$ of said linear compensator normalized by the mass of the virtual object, said linear compensator having proportional-derivative action of $K_i(s)=k_v s+k_p$.

5. The method of claim 1, further comprising the steps of:
quantifying the deviation from the natural motion of said virtual object introduced by the minimization step; and
augmenting, at each of said one or more computers, said local user input with a lead compensator filter that substantially recovers the natural motion of said virtual object.

6. The method of claim 5, wherein the lead compensator filter approximates a filter transfer function $$L(s) = \frac{s+1/T}{s+1/(\gamma T)}, (\gamma < 1), \text{ wherein}$$

$$\gamma = \frac{1}{\mu}, \mu = \underline{\lim}|D(j\omega)| \text{ as } w \to 0,$$

$D(j\omega)$ represents said deviation from the natural motion at a particular computer, and T is a positive filter parameter related to a user input frequency $\omega_m$ at which a maximum phase delay in $D(j\omega)$ occurs by the formula $$w_m = \frac{1}{\sqrt{\gamma} T}.$$

7. The method of claim 1, wherein said plurality of computers are configured in a closed, ring-type peer-to-peer topology for circulating said propagated sequences of data packets.

8. The method of claim 1, wherein:
said plurality of computers comprise client computers; and
said another computer comprises a server to which each of said plurality of computers is connected via said communication links, such that all of the data packets are propagated to and received from said server, which regulates data flow of said data packets from an (i)-th computer to an (i+1)-th computer.

9. The method of claim 1, further comprising the step of selecting a data propagation configuration among said plurality of computers that minimizes the total delay encountered by data packets making a round trip among the plurality of computers.

10. The method of claim 1, wherein said input means comprises a haptic device.

11. The method of claim 1, wherein providing feedback further comprises at least one action, taken at each of said one or more computers, selected from the group consisting of rendering local graphics, rendering local haptics, and emitting one or more audible messages.

12. The method of claim 1, wherein the data packets are comprised of temporal data, virtual object position data, and virtual object velocity data relative to each locally simulated model of the virtual object state for each of said plurality of computers, and data associated with the sum of external forces input by said users.

13. The method of claim 1, wherein said remote computer and said another computer are the same computer.

14. System for synchronizing the evolving state of a dynamic object in a SVE among a plurality of geographically separate computers connected by data communications links introducing time delays in the propagation of data between said computers, each computer connected to an input device permitting a user to interact with a virtual environment, comprising:

a plurality of computers interconnected in a data communications network;

a program component executing on each computer simulating a synchronous local model of the state of a dynamic virtual object in a SVE;

a program component executing on each computer implementing a synchronization controller adapted to perform the steps of:

simulating, at each computer of said plurality of computers, a synchronous local model of a state of the dynamic virtual object in the SVE, each synchronous local model of said dynamic virtual object state being initially identical;

permitting users of one or more computers of said plurality of computers to interact via said input means with the corresponding one or more synchronous local models of said dynamic virtual object state so as to induce one or more local changes in said corresponding one or more synchronous local model of said dynamic virtual object state;

propagating from each computer sequences of data packets indicative of the synchronous local model of said dynamic virtual object associated with said propagating local computer to a remote computer in said network, the sequences of data packets being propagated along said communications links thereby introducing time delays into the propagation;

receiving at each computer said sequences of data packets propagated from another computer, said sequences of data packets having time delays from said propagation over said communication links;

compensating at each computer for dynamic virtual object state errors resulting from user inputs at said one or more computers and from said time delays by minimizing the differences between the corresponding local model of said dynamic virtual object state and the one or more induced local changes in dynamic virtual object state as indicated by the received time delayed data packets while maintaining consistency within a tolerable bound between said one or more computers; and providing each of said one or more users with feedback reflecting an error-compensated, locally-simulated model of said dynamic virtual object state in said SVE.

15. The system of claim 14, wherein said program component further executes instructions for generating, at each computer, corrective control forces that reduce the state differences between each of said local models of said virtual object states and the one or more induced local changes in virtual object state as indicated by the received time delayed data packets with a synchronization controller.

16. The system of claim 15, wherein:
said synchronization controller is comprised of a linear compensator and a state estimator;
said linear compensator receiving at its input the difference between the one or more induced local changes in virtual object state contained in the time delayed data packets received from said another computer and the sum of feedback including data packets output by the local computer having been circulated completely about the network and the output of said state estimator; and
said state estimator accepting as input the output of the linear compensator, said state estimator based upon a Smith predictor model $P_i(s)(1-e^{-sR})$, where $P_i(s)$ comprises the virtual reality object dynamics of said virtual object, and $e^{-sR}$ denotes the round trip delay R in the Laplace domain representation taken by a data packet to propagate completely about the plurality of computers.

17. The system of claim 15, wherein said program component further executes instructions for approximating via stability analysis said tolerable bound of round trip delay, $R_{MAD}$, per $$R_{MAD} = 4 \tan^{-1}\left(\bar{k}_v \sqrt{\frac{2}{\bar{k}_p}}\right) / \sqrt{2\bar{k}_p},$$

wherein $\bar{k}_v$ represents the velocity control gain $k_v$ of said linear compensator normalized by the mass of the virtual object, and $\bar{k}_p$ represents the proportional constant control gain $k_p$ of said linear compensator normalized by the mass of the virtual object, said linear compensator having proportional-derivative action of $K_i(s)=k_v s+k_p$.

18. The method of claim 14, wherein said program component further executes instructions for:
quantifying the deviation from the natural motion of said virtual object introduced by the minimization step; and
augmenting, at each of said one or more computers, said local user input with a lead compensator filter that substantially recovers the natural motion of said virtual object.

19. The system of claim 18, wherein the lead compensator filter approximates a filter transfer function $$L(s) = \frac{s+1/T}{s+1/(\gamma T)}, (\gamma < 1), \text{ wherein}$$

$\gamma = \frac{1}{\mu}, \mu = \underline{\lim}|D(j\omega)|$ as $w \to 0$, $D(j\omega)$ represents said deviation from the natural motion at a particular computer, and T is a positive filter parameter related to a user input frequency $\omega_m$ at which a maximum phase delay in $D(j\omega)$ occurs by the formula $$w_m = \frac{1}{\sqrt{\gamma}\,T}.$$

20. The system of claim 14, wherein said plurality of computers are configured in a closed, ring-type peer-to-peer topology for circulating said propagated sequences of data packets.

21. The system of claim 14, wherein:
said plurality of computers comprise client computers; and
said another computer comprises a server to which each of said plurality of computers is connected via said communication links, such that all of the data packets are propagated to and received from said server, which regulates data flow of said data packets from an (i)-th computer to an (i+1)-th computer.

22. The system of claim 14, wherein said program component further executes instructions for selecting a data propagation configuration among said plurality of computers that minimizes the total delay encountered by data packets making a round trip among the plurality of computers.

23. The system of claim 14, wherein said input means comprises a haptic device.

24. The system of claim 14, wherein providing feedback further comprises at least one action, taken at each of said one or more computers, selected from the group consisting of rendering local graphics, rendering local haptics, and emitting one or more audible messages.

25. The system of claim 14, wherein the data packets are comprised of temporal data, virtual object position data, and virtual object velocity data relative to each locally simulated model of the virtual object SVE state for each of said plurality of computers, and data associated with the sum of external forces input by said users.

26. The system of claim 14, wherein said remote computer and said another computer are the same computer.

27. Machine-readable program storage medium tangibly embodying a program of instructions, the instructions executable by a plurality of computers to perform method steps for synchronizing the evolving state of a dynamic object in a shared virtual environment among a plurality of geographically separated computers connected in a communications network including data communications links introducing time delays in the propagation of data between said computers, each computer connected to input means permitting a user to interact with a virtual environment, the method steps comprising:
simulating, at each computer of said plurality of computers, a synchronous local model of a state of a dynamic virtual object in a shared virtual environment (SVE), each synchronous local model of said dynamic virtual object state being initially identical;
permitting users of one or more computers of said plurality of computers to interact via said input means with the corresponding one or more synchronous local models of said dynamic virtual object state so as to induce one or more local changes in said corresponding one or more synchronous local model of said dynamic virtual object state;
propagating from each computer sequences of data packets indicative of the synchronous local model of said dynamic virtual object associated with said propagating local computer to a remote computer in said network, the sequences of data packets being propagated along said communications links thereby introducing time delays into the propagation;

receiving at each computer said sequences of data packets propagated from another computer, said sequences of data packets having time delays from said propagation over said communication links;

compensating at each computer for dynamic virtual object state errors resulting from user inputs at said one or more computers and from said time delays by minimizing the differences between the corresponding local model of said dynamic virtual object state and the one or more induced local changes in dynamic virtual object state as indicated by the received time delayed data packets while maintaining consistency within a tolerable bound between said one or more computers; and providing each of said one or more users with feedback reflecting an error-compensated, locally-simulated model of said dynamic virtual object state in said SVE.

28. The machine-readable program storage medium of claim 27, wherein the compensating step further comprises generating, at each computer, corrective control forces that reduce the state differences between each of said local models of said virtual object states and the one or more induced local changes in virtual object state as indicated by the received time delayed data packets with a synchronization controller.

29. The machine-readable program storage medium of claim 28, wherein:

said synchronization controller is comprised of a linear compensator and a state estimator;

said linear compensator receiving at its input the difference between the one or more induced local changes in virtual object state contained in the time delayed data packets received from said another computer and the sum of feedback including data packets output by the local computer having been circulated completely about the network and the output of said state estimator; and said stale estimator accepting as input the output of the linear compensator, said state estimator based upon a Smith predictor model $P_i(s)(1-e^{-sR})$, where $P_i(s)$ comprises the virtual reality object dynamics of said virtual object, and $e^{-sR}$ denotes the round trip delay R in the Laplace domain representation taken by a data packet to propagate completely about the plurality of computers.

30. The machine-readable program storage medium of claim 28, the method steps further comprising approximating via stability analysis said tolerable bound of round trip delay, $R_{MAD}$, per $$R_{MAD} = 4 \tan^{-1}\left(\bar{k}_v \sqrt{\frac{2}{\bar{k}_p}}\right) / \sqrt{2\bar{k}_p},$$

wherein $\bar{k}_v$ represents the velocity control gain $k_v$ of said linear compensator normalized by the mass of the virtual object, and $\bar{k}_p$ represents the proportional constant control gain $k_p$ of said linear compensator normalized by the mass of the virtual object, said linear compensator having proportional-derivative action of $K_i(s) = k_v s + k_p$.

31. The machine-readable program storage medium of claim 27, the method steps further comprising:

quantifying the deviation from the natural motion of said virtual object introduced by the minimization step; and augmenting, at each of said one or more computers, said local user input with a lead compensator filter that substantially recovers the natural motion of said virtual object.

32. The machine-readable program storage medium of claim 31, wherein the lead compensator filter approximates a filter transfer function $$L(s) = \frac{s + 1/T}{s + 1/(\gamma T)}, (\gamma < 1), \text{ wherein}$$

$$\gamma = \frac{1}{\mu}, \mu = \underline{\lim}|D(j\omega)| \text{ as } w \to 0,$$

$D(j\omega)$ represents said deviation from the natural motion at a particular computer, and T is a positive filter parameter related to a user input frequency $\omega_m$ at which a maximum phase delay in $D(j\omega)$ occurs by the formula $$w_m = \frac{1}{\sqrt{\gamma} \ T}.$$

33. The machine-readable program storage medium of claim 27, the method steps further comprising selecting a data propagation configuration among said plurality of computers that minimizes the total delay encountered by data packets making a round trip among the plurality of computers.

34. The machine-readable program storage medium of claim 27, wherein the method step of providing feedback further comprises at least one action, taken at each of said one or more computers, selected from the group consisting of rendering local graphics, rendering local haptics, and emitting one or more audible messages.

35. The machine-readable program storage medium of claim 27, wherein the data packets are comprised of temporal data, virtual object position data, and virtual object velocity data relative to each locally simulated model of the virtual object state for each of said plurality of computers, and data associated with the sum of external forces input by said users.

* * * * *

UNITED STATES PATENT AND TRADEMARK OFFICE
CERTIFICATE OF CORRECTION

PATENT NO. : 7,642,989 B2  Page 1 of 1
APPLICATION NO. : 11/378151
DATED : January 5, 2010
INVENTOR(S) : Cheong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 917 days.

Signed and Sealed this

Sixteenth Day of November, 2010

David J. Kappos
*Director of the United States Patent and Trademark Office*